US009094350B2

(12) United States Patent
Chao et al.

(10) Patent No.: US 9,094,350 B2
(45) Date of Patent: Jul. 28, 2015

(54) FINDING NONEQUIVALENT CLASSIFIERS TO REDUCE TERNARY CONTENT ADDRESSABLE MEMORY (TCAM) USAGE

(71) Applicants: H. Jonathan Chao, Holmdel, NJ (US); Rihua Wei, Vista, CA (US); Yang Xu, Brooklyn, NY (US)

(72) Inventors: H. Jonathan Chao, Holmdel, NJ (US); Rihua Wei, Vista, CA (US); Yang Xu, Brooklyn, NY (US)

(73) Assignee: Polytechnic Institute of New York University, Brooklyn, NY (US)

( * ) Notice: Subject to any disclaimer, the term of this patent is extended or adjusted under 35 U.S.C. 154(b) by 326 days.

(21) Appl. No.: 13/837,490

(22) Filed: Mar. 15, 2013

(65) Prior Publication Data
US 2014/0269715 A1 Sep. 18, 2014

(51) Int. Cl.
G06N 5/04 (2006.01)
H04L 12/56 (2006.01)
H04L 12/743 (2013.01)
H04L 12/701 (2013.01)
H04L 12/54 (2013.01)

(52) U.S. Cl.
CPC ........ H04L 45/7457 (2013.01); H04L 12/5689 (2013.01); *H04L 12/56* (2013.01); *H04L 45/00* (2013.01)

(58) Field of Classification Search
None
See application file for complete search history.

(56) References Cited

PUBLICATIONS

Liu et al., Firewall compressor: An algorithm for minimizing firewall policies. INFOCOM [online], 2008 [retrieved on Mar. 25, 2015]. Retrieved from the Internet:<URL:http://www.google.com/url?sa=t&rct=j&q=&esrc=s&frm=1&source=web&cd=2&cad=rja&uact=8&ved=0CCcQFjAB&url=http%3A%2F%2Fieeexplore.ieee.org%2Fxpls%2Fabs_all.jsp>.*

Meiners et al., Topological Transformation Approaches to Optimizing TCAM Based Packet Classification Systems. [online], 2009 [retrieved on Mar. 25, 2015]. Retrieved from the Internet:<URL:http://www.google.com/url?sa=t&rct=j&q=&esrc=s&frm=1&source=web&cd=1&cad=rja&uact=8&ved=0CCYQFjAA&url=http%3A%2F%2Fs5.cse.msu.edu%2F~meinersc%2Fpub>.*

* cited by examiner

*Primary Examiner* — Alan Chen
*Assistant Examiner* — Nathan Brown, Jr.
(74) *Attorney, Agent, or Firm* — John C. Pokotylo; Straub & Pokotylo

(57) ABSTRACT

The problem of providing an efficient physical implementation of a (first) classifier defined by a first rule set, at least a part of which first classifier having a sparse distribution in Boolean space, is solved by (1) converting the first classifier, having a corresponding Boolean space, into a second classifier, wherein the second classifier has a corresponding Boolean space which is not semantically equivalent to the Boolean space corresponding to the first classifier, and wherein the second classifier is defined by a second set of rules which is smaller than the first set of rules defining the first classifier; and (2) defining a bit string transformation which transforms a first bit string into a second bit string, wherein applying the first bit string to the first classifier is equivalent to applying the second bit string to the second classifier. In at least some example embodiments, the first bit string includes packet header information. In at least some example embodiments, the second classifier is implemented on a TCAM. In at least some example embodiments, the bit string transformation is implemented on an FPGA.

20 Claims, 18 Drawing Sheets

| | 110 | 120 | 130 | 140 | 150 | 160 | 170 |
|---|---|---|---|---|---|---|---|
| | Rule | Source IP | Dest IP | Source Port | Dest Port | Protocol | Action |
| | R1 | * | 192.168.1.1 | [1, 5] | [1, 5] | UDP | Deny |
| | R2 | 166.111.*.* | 192.168.1.* | * | * | * | Accept |
| | R3 | * | * | * | * | * | Deny |

100

(a) Dense

WXYZ
| WXYZ | |
|---|---|
| 0000 | Accept |
| 0001 | Accept |
| 0011 | Accept |
| 0010 | Accept |
| 0101 | Accept |
| 0111 | Accept |
| 0110 | Accept |
| **** | Deny |

| YZ \ WX | 00 | 01 | 11 | 10 |
|---|---|---|---|---|
| 00 | A | D | D | D |
| 01 | A | A | D | D |
| 11 | A | A | D | D |
| 10 | A | A | D | D |

FIGURE 4(a)

(b) Sparse

| YZ \ WX | 00 | 01 | 11 | 10 |
|---|---|---|---|---|
| 00 | D | A | D | A |
| 01 | A | D | A | D |
| 11 | D | A | D | A |
| 10 | A | D | A | D |

| WXYZ | |
|---|---|
| 0001 | Accept |
| 0010 | Accept |
| 0100 | Accept |
| 0111 | Accept |
| 1101 | Accept |
| 1110 | Accept |
| 1000 | Accept |
| 1011 | Accept |
| **** | Deny |

| Merging | Permutation | |
|---|---|---|
| | Target Blocks | Assistant Blocks |
| (1) Block distance = 1<br>(2) Same block size<br>(3) Same direction<br>(4) Same action | (1) Block distance >= 2<br>(2) Same block size<br>(3) Same direction<br>(4) Same action | (1) Block distance >= 1<br>(2) Same block size<br>(3) Same direction<br>(4) Cover one and only one target block |

800

| Counterpart Bits | $W_1 \cdots W_M$ | $X_1 \cdots X_N$ | $Y_1 \cdots Y_{D-1}$ | $Y_D$ |
|---|---|---|---|---|
| | |←— | L=M+N+D | —→| |
| Target Block 1 | * ⋯ * | 1 ⋯ 1 | 1 ⋯ 1 | 1 |
| Target Block 2 | * ⋯ * | 1 ⋯ 1 | 0 ⋯ 0 | 0 |
| Block 1 | * ⋯ * | 1 ⋯ 1 | 0 ⋯ 0 | 1 |
| Assistant Block 1 | * ⋯ * | * ⋯ * | 1 ⋯ 1 | 1 |
| Assistant Block 2 | * ⋯ * | * ⋯ * | 0 ⋯ 0 | 1 |
| Block 1(a) | * ⋯ * | 1 ⋯ 1 | 1 ⋯ 0 | 1 |
| Assistant Block 1(a) | * ⋯ * | * ⋯ * | * ⋯ 1 | 1 |
| Assistant Block 2(a) | * ⋯ * | * ⋯ * | * ⋯ 0 | 1 |
| Block 1(b) | * ⋯ * | 1 ⋯ 1 | 0 ⋯ 0 | 1 |
| Block 2(b) | * ⋯ * | 1 ⋯ 1 | 1 ⋯ 1 | 0 |
| Assistant Block 1(b) | * ⋯ * | * ⋯ * | 1 ⋯ 1 | * |
| Assistant Block 2(b) | * ⋯ * | * ⋯ * | 0 ⋯ 0 | * |

FIGURE 12

| Transformation (1) | Transformation (2) | Final Equation |
|---|---|---|
| 11--◇01-- | --01◇--11 | Substitute (1) into (2) |
| $\begin{cases} W^{(1)} = \overline{W}X + W\overline{X} \\ X^{(1)} = X \\ Y^{(1)} = Y \\ Z^{(1)} = Z \end{cases}$ | $\begin{cases} W^{(2)} = W^{(1)} \\ X^{(2)} = X^{(1)} \\ Y^{(2)} = \overline{Y^{(1)}}Z^{(1)} + Y^{(1)}\overline{Z^{(1)}} \\ Z^{(2)} = Z^{(1)} \end{cases}$ | $\begin{cases} W^{(2)} = \overline{W}X + W\overline{X} \\ X^{(2)} = X \\ Y^{(2)} = \overline{Y}Z + Y\overline{Z} \\ Z^{(2)} = Z \end{cases}$ |

| Source | Classifier | # of Rules | # of Prefixes | Expansion Ratio | Prefixes reduced by Preproc | Compression Ratio | Prefixes reduced by Permu | Compression Ratio | Total Rule reduced | Compression Ratio | # of Permu | Permu time (minutes) | Preproc time (minutes) | Total time (minutes) |
|---|---|---|---|---|---|---|---|---|---|---|---|---|---|---|
| Class-Bench | fw-1 | 60 | 115 | 1.92 | 69 | 60.00% | 12 | 10.43% | 81 | 70.43% | 7 | 0.003 | 0.007 | 0.010 |
| | fw-2 | 132 | 277 | 2.10 | 173 | 62.45% | 23 | 8.30% | 196 | 70.76% | 13 | 0.015 | 1.351 | 1.366 |
| | acl-1 | 187 | 357 | 1.91 | 50 | 14.01% | 139 | 38.94% | 189 | 52.94% | 79 | 6.756 | 0.003 | 6.759 |
| | acl-2 | 217 | 271 | 1.25 | 1 | 0.37% | 154 | 56.83% | 155 | 57.20% | 134 | 4.801 | 0.002 | 4.803 |
| | acl-3 | 221 | 312 | 1.41 | 3 | 0.96% | 66 | 21.15% | 69 | 22.12% | 57 | 9.258 | 0.012 | 9.270 |
| | ipc-1 | 202 | 584 | 2.89 | 14 | 2.40% | 237 | 40.58% | 251 | 42.98% | 101 | 22.715 | 0.006 | 22.721 |
| | ipc-2 | 207 | 538 | 2.60 | 0 | 0.00% | 326 | 60.59% | 326 | 60.59% | 121 | 19.055 | 0.005 | 19.060 |
| Real-life | real-1 | 660 | 807 | 1.22 | 295 | 36.56% | 148 | 18.34% | 443 | 54.89% | 59 | 56.032 | 0.032 | 56.064 |
| Avg | | 235.75 | 407.63 | 1.91 | 75.63 | 22.09% | 138.13 | 31.90% | 213.75 | 53.99% | 71.38 | 14.829 | 0.177 | 15.007 |

| Source | Classifier | TCAM saved by Preprocess | | TCAM saved by Permutation | | FPGA consumed | | | Ratio-1 | Ratio-2 | Pipeline | | Time (minutes) |
|---|---|---|---|---|---|---|---|---|---|---|---|---|---|
| | | Entries | Gate Count | Entries | Gate Count | CFs | Registers | Gate Count | | | Stages | Clock Rate | |
| Class-Bench | fw-1 | 69 | 35880 | 12 | 6240 | 69 | 104 | 831 | 13.32% | 1.97% | 1 | 395.57 | 2.13 |
| | fw-2 | 173 | 89960 | 23 | 11960 | 50 | 208 | 1398 | 11.69% | 1.37% | 2 | 216.59 | 4.05 |
| | acl-1 | 50 | 26000 | 139 | 72280 | 2346 | 1560 | 16398 | 22.69% | 16.68% | 15 | 114.53 | 32.25 |
| | acl-2 | 1 | 520 | 154 | 80080 | 4389 | 1872 | 24399 | 30.47% | 30.27% | 18 | 101.36 | 37.30 |
| | acl-3 | 3 | 1560 | 66 | 34320 | 1335 | 936 | 9621 | 28.03% | 26.81% | 9 | 118.12 | 21.05 |
| | ipc-1 | 14 | 7280 | 237 | 123240 | 2813 | 1768 | 19047 | 15.46% | 14.99% | 17 | 114.29 | 34.60 |
| | ipc-2 | 0 | 0 | 326 | 169520 | 3469 | 1768 | 21015 | 12.40% | 12.40% | 17 | 101.36 | 35.20 |
| Real-life | real-1 | 295 | 153400 | 148 | 76960 | 967 | 832 | 7893 | 10.26% | 3.43% | 8 | 109.19 | 8.45 |
| AVG | | 75.63 | 39325.00 | 138.125 | 71825 | 1930 | 1131 | 12575.25 | 18.04% | 13.44% | 10.875 | 158.88 | 21.88 |

FINDING NONEQUIVALENT CLASSIFIERS TO REDUCE TERNARY CONTENT ADDRESSABLE MEMORY (TCAM) USAGE

§1. BACKGROUND OF THE INVENTION

§1.1 Field of the Invention

The present invention concerns logic optimization. More specifically, the present invention concerns optimizing classifiers, such as classifiers encoded onto a ternary content addressable memory ("TCAM") for example.

§1.2 Background Information

§1.2.1 Packet Classification and TCAMs

Packet classification has been used as a basic building block in many network applications such as quality of service ("QoS"), flow-based routing, firewalls, and network address translation ("NAT"). (See, e.g., D. E. Taylor, "Survey and taxonomy of packet classification techniques," *ACM Computer Surveys*, pp. 238-275, 2005; and Y. Xu, Z. Liu, Z. Zhang, H. J. Chao, "An Ultra High Throughput and Memory Efficient Pipeline Architecture for Multi-Match Packet Classification without TCAMs", *ACM/IEEE ANCS*, 2009, both incorporated herein by reference.) In packet classification, information is extracted from the packet header and compared against a classifier consisting of a list of rules. Once an incoming packet matches some rules, it will be processed based on the action associated with the highest-priority matched rule. The table 100 of FIG. 1 illustrates a sample classifier with three rules (R1-R3) 110. Each of the three rules 110 specifies a pattern of five fields; namely, source Internet Protocol ("IP") (prefix) 120, destination IP (prefix) 130, source port (range) 140, a destination port (range) 150, and protocol type 160. From the geometric point of view, each rule can be viewed as a hyper-rectangle (also referred to a "block" in this application) in the 104-dimensional Boolean Space, corresponding to the 104 bits in the five fields.

TCAM has been widely used to implement packet classification because of its parallel search capability and constant processing speed. A TCAM has a massive array of entries (See, e.g., K. Pagiamtzis and A. Sheikholeslami, "Content-addressable memory (CAM) circuits and architectures: A tutorial and survey," *IEEE Journal of Solid-State Circuits*, vol. 41, no. 3, pp. 712-727, March 2006, incorporated herein by reference.), in which each bit can be represented in either '0', '1', or "*" (wildcard). Before a rule can be stored in TCAMs, its range fields are converted to prefixes. For example, rule R2 110 of FIG. 1 requires only one TCAM entry since it contains only prefix fields. However, for rule R1, both the source port 140 and destination port 150 contain a range [1, 5]. Consequently, both of them need to be expanded to three prefixes, i.e., "001" (corresponding to "1"), "01*" (corresponding to "2" and "3"), and "10*" (corresponding to "4" and "5"). The combination of the prefix specifications of the two ranges for source port 140 and destination port 150 will consume 9 (=3×3) TCAM entries. This simple example illustrates the well-known "range expansion" problem. (Hereafter, assume that all the classifiers used in examples have already been expanded to prefixes, and no longer contain ranges.) Since TCAMs not only expensive, but also power-hungry, the range expansion problem heavily increases not only the manufacturing cost, but also the operation cost of network equipment provided with TCAMs.

§1.2.2 The Need for TCAM Entry Reduction

Given the expense and power consumption of TCAMs, it is very desirable to reduce the TCAM entries that are required to represent a classifier. Previous work in this field can be classified into three categories; namely, hardware improvement, range encoding, and classifier compression. Each of these three categories of TCAM entry reduction is introduced below.

First, approaches in the category of TCAM hardware improvement require modifications in the TCAM hardware to directly support range matching. For example, there have been attempts to directly compare ranges by introducing a two-level hardware hierarchy and incorporating special range comparison circuits into TCAM arrays. (See, e.g., E. Spitznagel, D. Taylor, and J. Turner, "Packet classification using extended tcams," *IEEE ICNP*, 2003, incorporated herein by reference.)

Second, most research to resolve the range expansion problem falls into the category of range encoding. (See, e.g., A. Bremler-Barr and D. Hendler, "Space-Efficient TCAM-based Classification Using Gray Coding," *IEEE INFOCOM*, 2007; A. Bremler-Barr, D. Hay and D. Hendler, "Layered Interval Codes for TCAM-based Classification," *IEEE INFOCOM*, 2009; M. Bando, N. S. Artan, R. Wei, X. Guo and H. J. Chao, "Range Hash for Regular Expression Pre-Filtering," *ACM/IEEE ANCS*, 2010; C. R. Meiners, A. X. Liu and E. Torng, "Topological Transformation Approaches to Optimizing TCAM-Based Packet Classification Systems," *SIGMETRICS*, 2009, 0. Rottenstreich and I. Keslassy, "Worst-Case TCAM Rule Expansion," *IEEE* INFOCOM, 2010, each of which is incorporated by reference.) With range encoding, each range field in the rules is represented by a unique binary code, which can be directly stored in TCAMs without causing range expansion. Although the range encoding can avoid range expansion, it requires a separate range searching on each non-prefix dimension before looking up the TCAMs.

Finally, in the category of classifier compression, approaches proposed by Draves (See, e.g., R. Draves, C. King, S. Venkatachary, and B. Zill, "Constructing optimal IP routing tables," *Proceedings of IEEE INFOCOM*, 1999, incorporated herein by reference.) and Suri (See, e.g., S. Suri, T. Sandholm, and P, "Warkhede. Compressing two-dimensional routing tables," *Algorithmica*, Vol. 35, pp. 287-300, 2003, incorporated herein by reference.) attempted to compress IP routing tables in TCAMs, which actually are special classifiers with only one field. Recent research on classifier compression (See, e.g., Q. Dong, S. Banerjee, J. Wang, D. Agrawal, and A. Shukla, "Packet classifiers in ternary CAMs can be smaller," *SIGMETRICS*, 2006; A. X. Liu, E. Torng, and C. Meiners, "Firewall compressor: An algorithm for minimizing firewall policies," *INFOCOM*, 2008; and R. McGeer and P. Yalagandula, "Minimizing Classifiers for TCAM Implementation," *Proceedings of IEEE INFOCOM*, 2009, each of which is incorporated herein by reference.) aim to convert the original classifiers to "semantically equivalent" classifiers that consume fewer TCAM entries.

§1.2.3 Limitations of Known Classifier Compression-Based TCAM Entry Reduction Previously-proposed schemes for classifier compression share a common objective (that is, to find a smaller and semantically equivalent classifier). Such schemes take advantage at least one of two properties; namely that rules are normally "action oriented" and rules following a "first matching" rule can be ignored. Each of these properties, which may be exploited for classifier compression, is introduced below.

First, regarding the fact that rules are often action-oriented, in packet classification, the action associated with a matched rule is often of paramount importance; the ID associated with the matched rule is typically not important. Therefore, a classifier can be modified as long as the modification doesn't change the action returned by each classification operation.

Consider FIG. 2(a) for example. Rules R1 and R2 can be merged into R4. Although the rules have been changed, the compressed classifier at the right is still equivalent to the original classifier on the left because the compressed classifier can still report the same action as the original classifier.

Second, regarding the first-matching property, when multiple rules match the same packet, TCAM only reports the first matched rule. FIGS. 2 (b) and 2(c) are two examples showing how to compress a classifier using the first-matching property. More specifically, in FIG. 2(b), because R2 is completely covered by R1, any packet matching R2 will definitely match R1. Consequently, R2 is a redundant rule and removing it will not affect the packet classification results. In FIG. 2(c), R1, R2 and R3 cannot be directly merged. However, by adding R0, these rules can be merged with R0 into a single rule R6. The one problem is that this would result in a non-equivalent classifier, because R0 forces the action of "0000" to be "Accept" even though it is "Deny" in the original classifier. To make the classifiers equivalent, R5 is added above (i.e., before) R0. Due to the first-matching property, R0 will be blocked by R5, and the compressed classifier of FIG. 2(c) is equivalent to the original classifier of FIG. 2(c).

Using the "action-oriented" and "first-matching" properties, Dong et al. proposed four simple heuristic algorithms, called Trimming, Expanding, Adding and Merging, to find the equivalent classifiers consuming fewer TCAM entries. (See, e.g., Q. Dong, S. Banerjee, J. Wang, D. Agrawal, and A. Shukla, "Packet classifiers in ternary CAMs can be smaller," *SIGMETRICS,* 2006, incorporated herein by reference.) Each heuristic algorithm works well for some certain scenarios. Dong's approach recursively searches a classifier to explore if any of these four heuristics can be applied to reduce rules. Liu et al. proposed an algorithm to compress the firewall classifiers. (See, e.g., A. X. Liu, E. Torng, and C. Meiners, "Firewall compressor: An algorithm for minimizing firewall policies," *INFOCOM,* 2008, incorporated herein by reference.) In the Liu et al. algorithm, ranges in the original classifier are first decomposed into non-overlapping ranges. Then, gaps between the non-overlapping ranges are filled to reduce the number of rules. Finally, Meiner et al. proposed a Topological Transformation Approach to reduce TCAM consumption with two steps. (See, e.g., C. R. Meiners, A. X. Liu and E. Torng, "Topological Transformation Approaches to Optimizing TCAM-Based Packet Classification Systems," *SIGMETRICS,* 2009, incorporated herein by reference.) The first step re-encodes and simplifies each field by detecting the equivalent range sections. The second step adjusts each field to alleviate the range expansion problem.

Conceptually, the Dong et al., Liu et al. and Meiner et al. papers all propose field-level schemes, which only focus on each field individually but fail to explore the compression across different fields. In viewing this, McGeer et al. proposed a bit-level solution in their work (See, e.g., R. McGeer and P. Yalagandula, "Minimizing Classifiers for TCAM Implementation," *Proceedings of IEEE INFOCOM,* 2009, incorporated herein by reference.) which can yield a higher compression. In McGeer's bit-level solution, the classifier compression problem is treated as a special logic optimization problem with 104 variables, and each rule in the classifier is a product of several variables in Boolean representation or a block in Boolean Space. Therefore, the existing logic optimization techniques can be applied to compress classifiers using the action-oriented property. Moreover, with the first-matching property of TCAM, the compression can be even better.

FIG. 3 is an example illustrating three steps of McGeer's scheme. In the first step, the original classifier 310 (with six rules) is mapped into the Boolean Space shown in the Karnaugh table 320 (See, e.g., Maurice Karnaugh, "The Map Method for Synthesis of Combinational Logic Circuits," *Transactions of the American Institute of Electrical Engineers,* part I 72 (9): 593-599, 1953, incorporated herein by reference.) Each rule corresponds to a block (or a point) in the Karnaugh table. During the mapping, the overlapping portion of rules is associated with the action of the highest-priority rule. For example, the point at the up-left corner (i.e. "0000 (WXYZ)"), which is covered by both the first and the last rule, is assigned with the action of the first rule (000*). In the second step, classical logic optimization algorithms are applied on the Karnaugh table 320 to merge the neighboring points with the same action to reduce rules. Referring to FIG. 3, "Accept" points are merged and Classifier 1 330 is obtained. In the third step, the first-matching property is applied to Classifier 1 330. Similar to the example described above with reference to FIG. 2(c), an even smaller classifier, which has only three rules (Classifier 2 340) can be obtained. Note that all three classifiers (310, 330 and 340) in the example of FIG. 3 are semantically equivalent since they correspond to the same Karnaugh table 320.

The foregoing classifier compression techniques exploit logic optimization and the first-matching property. Unfortunately, however, the performance of the compression using the foregoing logic optimization and the first-matching property greatly depends on the "rule distribution" of the classifier (e.g., the distributions of rules with action "accept" or "deny" in the Boolean Space). For example, FIGS. 4(a) and 4(b) illustrated two classifiers with different rule distributions. In FIG. 4(a), "rule elements" (a "rule element" is the smallest unit, i.e., a point in the Boolean Space associated with an action) associated with the same action are densely populated. On the other hand, in FIG. 4(b), rule elements are spread sparsely in the Boolean Space. Logic optimization and the first-matching property are very suitable for compressing the densely populated rule distribution in FIG. 4(a). Unfortunately, however, logic optimization and the first-matching property perform poorly under the sparse rule distribution in FIG. 4(b). More specifically, since rule elements in FIG. 4(b) are spread sparsely and no two neighboring rule elements have the same action, no two elements can be directly merged using logic optimization. So under such circumstances, logic optimization cannot contribute much compression. Furthermore the first-matching property cannot contribute much compression. For example, to reduce the number of "Accept" rules using the first-matching property, one would have to create and put many "Deny" rules in the high-priority places (similar to what was done in FIG. 2(c)). This would result in an even larger classifier.

As should be appreciated from the example discussed with reference to FIG. 4(b), it would be useful to be able to compress classifiers having sparse rule distributions. Furthermore, even if a classifier has a rule distribution not as extreme as that in FIG. 4(b), it might have dense rule distributions in some areas, but sparse rule distributions in some other areas. Therefore, it would be useful to be able to compress areas of sparse rule distributions using a new technique, even if know techniques are used to compress areas of dense rule distributions.

§2. SUMMARY OF THE INVENTION

The problem of providing an efficient physical implementation of a (first) classifier defined by a first rule set, at least a part of which first classifier having a sparse distribution in Boolean space, is solved by (1) converting the first classifier, having a corresponding Boolean space, into a second classifier, wherein the second classifier has a corresponding Boolean space which is not semantically equivalent to the Boolean space corresponding to the first classifier, and wherein the second classifier is defined by a second set of rules which is smaller than the first set of rules defining the first classifier; and (2) defining a bit string transformation which transforms a first bit string into a second bit string, wherein applying the first bit string to the first classifier is equivalent to applying the second bit string to the second classifier. In at least some example embodiments consistent with the present invention, the first bit string includes packet header information.

In at least some example embodiments consistent with the present invention, a cost function corresponding to programmable logic implementing the bit string transformation is less than a difference in cost functions of a TCAM implementation of the first classifier and a TCAM implementation of the second classifier. For example, the cost function may be a function of a number of transistors.

In at least some example embodiments consistent with the present invention, the first classifier consists of a rule set defining binary actions such as, for example, admit or deny. In other example embodiments consistent with the present invention, the first classifier consists of a rule set defining n-ary actions, where n is greater than two.

At least some example embodiments consistent with the present invention may include apparatus emulating a (first) classifier defined by a first rule set, at least a part of which first classifier having a sparse distribution in Boolean space, the apparatus comprising: (1) a second classifier module, wherein the second classifier has a corresponding Boolean space which is not semantically equivalent to the Boolean space corresponding to the first classifier, and wherein the second classifier is defined by a second set of rules which is smaller (e.g., has fewer rules) than the first set of rules defining the first classifier; and (2) a bit string transformation module which transforms a first bit string into a second bit string, wherein applying the first bit string to the first classifier is equivalent to applying the second bit string to the second classifier. In at least some example embodiments consistent with the present invention, both the second classifier module and the bit string transformation module are provided on a single chip. In at least some example embodiments consistent with the present invention, the single chip may also include a power control module. In at least some embodiments consistent with the present invention, the second classifier module is a TCAM. In at least some embodiments consistent with the present invention, the bit string transformation module is a FPGA.

§3. BRIEF DESCRIPTION OF THE DRAWINGS

FIG. 1 illustrates a conventional simple packet classifier.

FIGS. 2(a)-2(c) illustrate conventional action oriented or first matching prefix compression.

FIG. 3 illustrates a conventional classifier compression scheme.

FIGS. 4(a) and 4(b) illustrate limitations of conventional classifier compression schemes.

FIGS. 5(a) and 5(b) illustrate an example of classifier compressions (permutations) and corresponding transformations using a process consistent with the present invention.

FIG. 8 is a table defining conditions to be met before merging and permuting two blocks in an example embodiment consistent with the present invention.

FIG. 12 illustrates examples of deducing Boolean representations of assistant blocks in a manner consistent with the present invention.

FIG. 19 is a table of classifier statistics and results from an experiment applying a compression process consistent with the present invention.

FIG. 20 is a table of results from FPGA implementation experiments.

§4. DETAILED DESCRIPTION

Figures 1, 2:
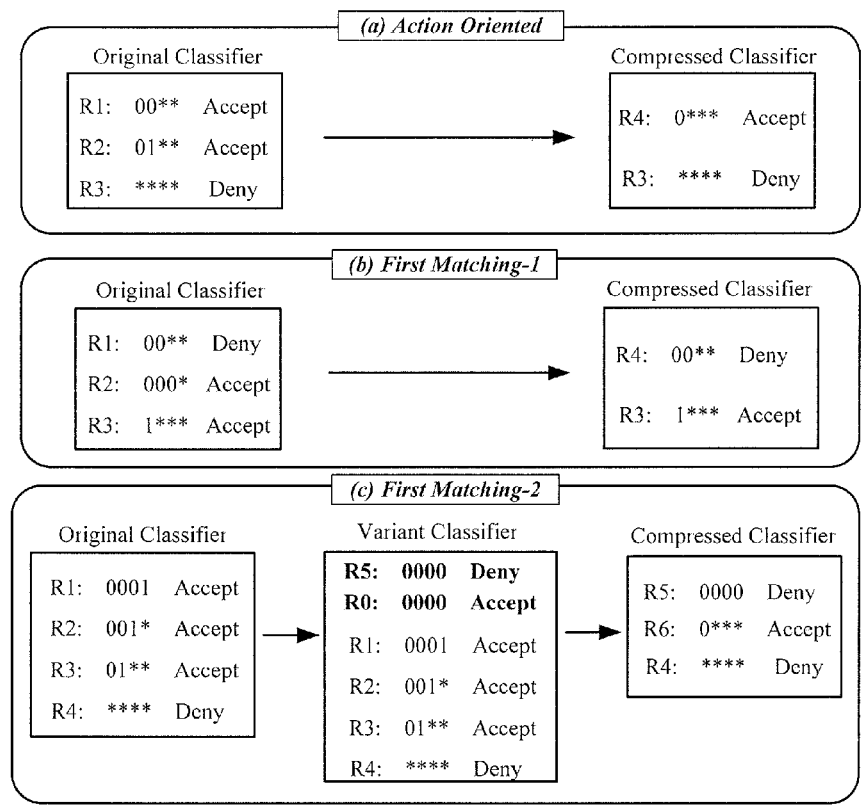
Figure 3:
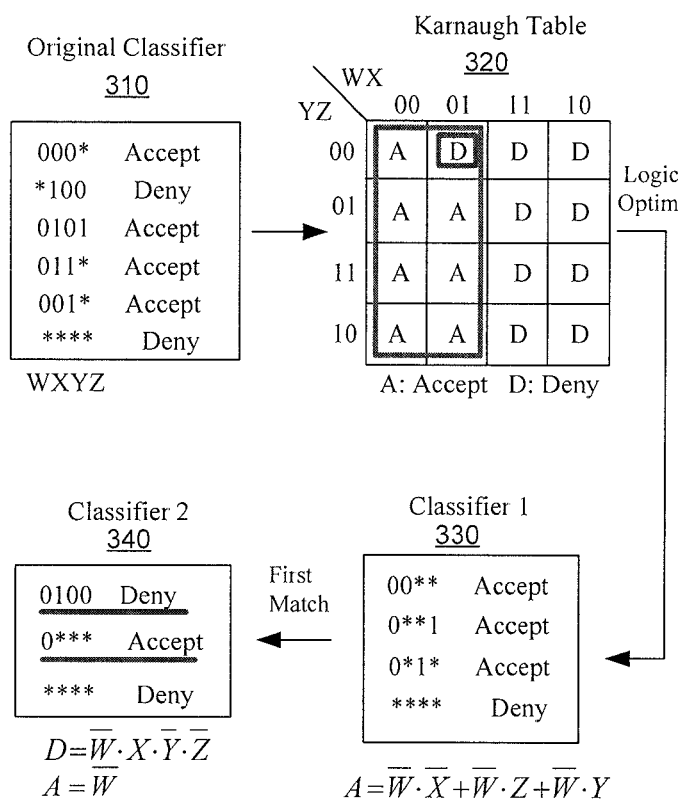

The present invention may involve novel methods, apparatus, message formats, and/or data structures for optimizing logic, such as logic corresponding to a classifier defined by a rule set. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§4.1 Overview

Example embodiments consistent with the present invention first convert sparse rule distributions to dense rule distributions, and then apply the logic optimization to merge rule elements that cannot be merged directly. Such embodiments may be orthogonal to the schemes that are suitable for dense rule distributions.

Example embodiments consistent with the present invention may provide bit-level solutions. For convenience, in the following description, all the classifiers in the examples consist of several "Accept" rules followed by a "Deny" rule as the default rule. For simplicity, all rules consist of only 4 bits, which are denoted by W, X, Y and Z, respectively. Assume that the default order of bits is WXYZ. So, denotation like Point "0000(WXYZ)" will be simplified to "0000".

The existing classifier compression schemes normally find semantically equivalent, though smaller, TCAM representations for the packet classifiers. In contrast, example embodiments consistent with the present invention convert packet classifiers to smaller TCAM representations which are not equivalent to the original classifiers. In this way, such example embodiments are useful to compress classifiers, especially under certain circumstances in which the existing compression schemes perform badly. An example technique consistent with the present invention, called "Block Permutation" (or "BP") provide an efficient heuristic approach to find permutations to compress classifiers and provide a hardware implementation which can perform packet classification operations based on the compressed classifiers. Experiments using ClassBench (See, e.g., D. E. Taylor and J. S. Turner, "ClassBench: A Packet Classification Benchmark," *IEEE INFOCOM*, 2005, incorporated herein by reference.) classifiers and ISP classifiers show that the BP technique can reduce TCAM entries by 53.99% on average.

In the following, §4.2 formally defines the problem of compressing classifiers and analyzes its complexity. Then, §4.3 defines terms and concepts that are used in an example heuristic BP process. Thereafter, §4.4 proposes an example heuristic BP process to compress classifiers. Next, §4.5 proposes example apparatus, including example hardware implementations that uses BP compressed classifiers. Section 4.6 describes refinements, alternatives and extensions of the example BP embodiment. Then, §4.7 presents experimental results obtained by the present inventors. Finally, §4.8 provides some conclusions.

§4.2 Example Block Permutation Problem

Figure 5A:
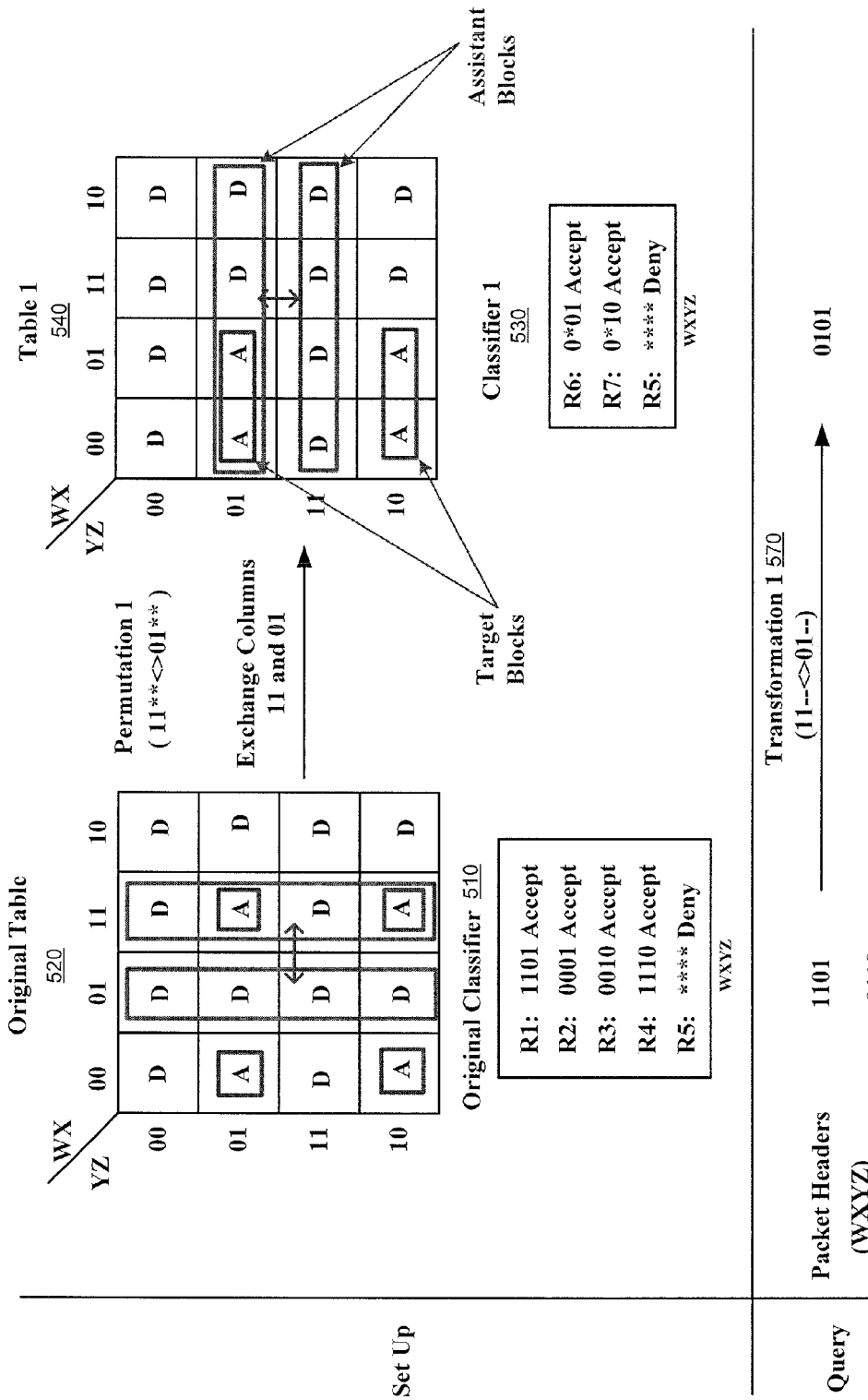
Figure 5B:
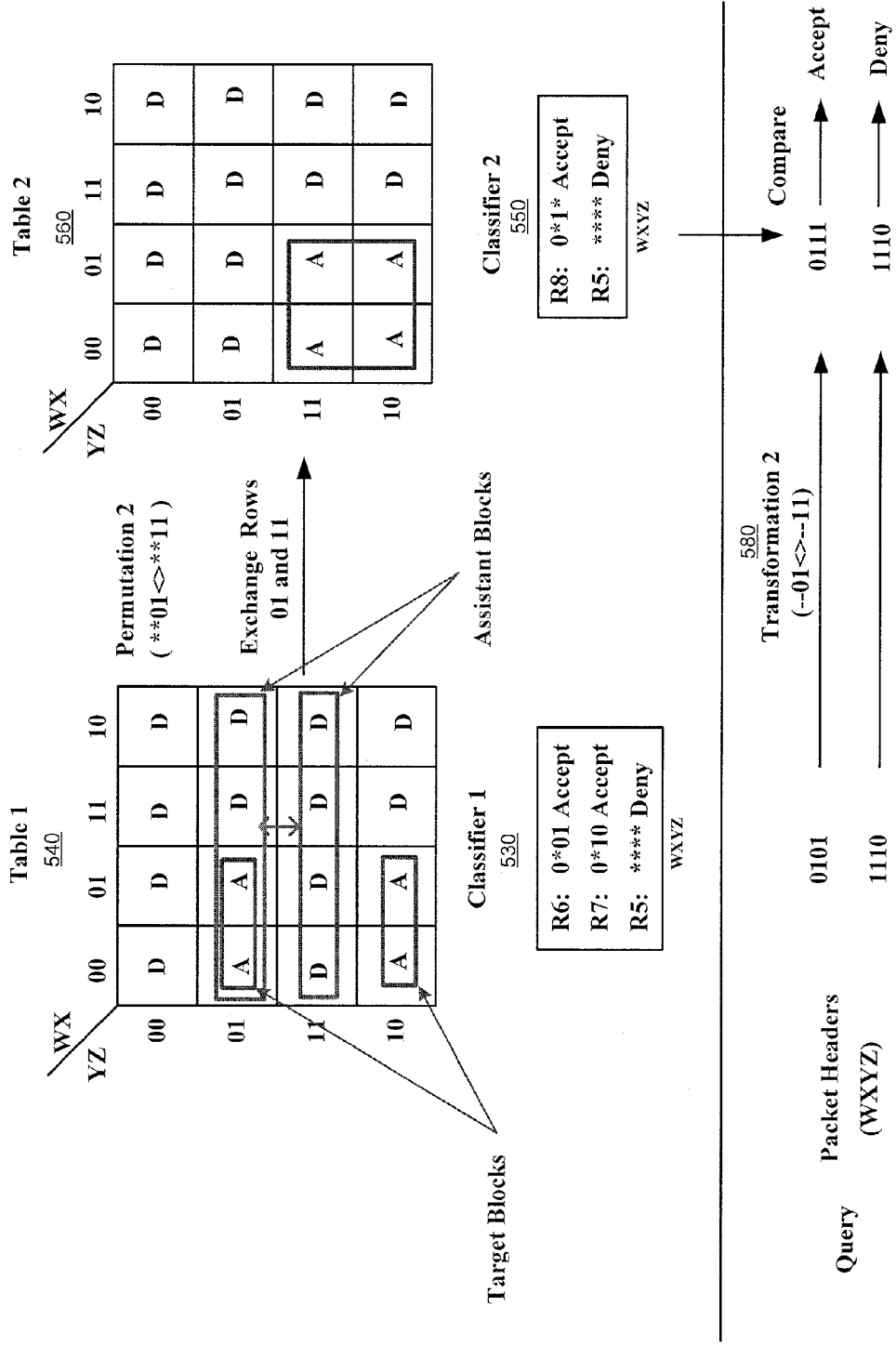

An example BP compression technique consistent with the present invention is described with reference to FIG. 5. In the example of FIG. 5, the "Original Classifier" 510 will be compressed by applying two simple "permutations" (defined in §4.3 below) which convert the Original Classifier's 510 rule distribution in Boolean space 520 from sparse to dense. More specifically, in the first permutation, column "11" and Column "01" are switched in the Original Table 520 and get Table 540. In the second permutation, Row "01" and Row "11" are switched in Table 1 540. Then by applying logic optimization on Table 2 540, the five rules of the original classifier 510 are merged into two rules, as shown in the final classifier 550.

Note, however, since the classifiers 510 and 550 are not semantically equivalent, two transformations (e.g., on the headers of incoming packets) corresponding to these two permutations are applied (e.g., before performing the packet classification operation on TCAMs). In the first transformation 570, if the WX bits of the packet header are "11" (or "01"), they are changed to "01" (or "11"); otherwise, the WX bits remain unchanged. This transformation 570 and its corresponding permutation is denoted as "11--< >01--" and "11< >01" respectively. (Note that while permutations operate on rules, transformations operate on the headers of incoming packets. In a permutation, all rule elements in the blocks are involved. In its transformation, only specific bits are involved. It is the reason why we use different denotations for the two related operations.) In the second transformation 580, "--01< >--11" is performed. In this way, applying a transformed bit string (e.g., packet headers) to Classifier 2 550 provides the same actions as if the original bit string (e.g., original packet headers) were applied to search the Original Classifier 510.

Figures 6, 7:
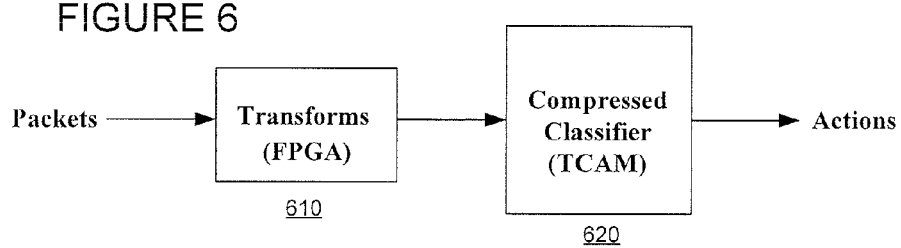
FIG. 6 is a block diagram of a hardware implementation consistent with the present invention.
FIG. 7 is an example illustrating computing overhead by applying logic optimization.

As should be appreciated from the foregoing example, given a classifier (e.g., 550) compressed by the example BP process, since it is not semantically equivalent to the original classifier (e.g., 510), an example implementation of a packet classifier uses two module. More specifically, as shown in FIG. 6, such an example implementation may include a Transformation Module 610 and a TCAM Module 620. As shown in FIG. 6, packet headers should be first processed by the Transformation Module 610 and then fed into the TCAM Module 620 that stores the compressed classifier. For this example implementation of the example BP process, the following issues should be considered in addition to the compression. First, with regard to processing speed, the Transformation Module 610 should be implemented by hardware to ensure a high performance. Second, with regard to overhead, although the BP process can reduce the size of the TCAM 620, the Transformation Module 610 does introduce overhead. However, the overhead is often much smaller than the TCAM resources saved. An example of computing and comparing overhead is described below.

Referring back to FIG. 5, consider permutation 2 (i.e., "01< >11") as an example of how to compute the overhead. Permutation 2 can save one TCAM entry. Suppose that before the transformation, the packet header has four bits which are $W^{(1)}$, $X^{(1)}$, $Y^{(1)}$ and $Z^{(1)}$. After the transformation, the four bits are transformed to $W^{(2)}$, $X^{(2)}$, $Y^{(2)}$ and $Z^{(2)}$. Traditionally, one can construct Boolean equations to represent this transformation. By simplifying these Boolean equations, one can determine the circuit overhead to implement the transformation corresponding to the permutation. Mathematically, this is a Multi-output Logic Optimization Problem. (See, e.g., G. D. Hachtel and F. Somenzi, "Logic synthesis and verification algorithms," Kluwer Academic Publishers, 2002, incorporated herein by reference.).

Referring to FIG. 7, consider the Karnaugh Tables 710-740 (each table representing the transformation of one bit). The foregoing problem can be solved by performing logic optimization on each table. The simplified Boolean equations are listed beneath each table 710-740. As shown, Permutation 2 only changes the value of Y bit, requiring one XOR gate to implement. So, the total overhead of Permutation 2 is only one XOR gate (which is equal to six transistors (See, e.g., J. M. Rabaey, "Digital Integrated Circuits (2nd Edition)," chap. 6, Prentice-Hall, 2003, incorporated herein by reference.). However, Permutation 2 can save one TCAM entry. In packet classification, one TCAM entry has 104 bits (although only 4 bits in this example). One TCAM bit requires 20 transistors. (See, e.g., University of Waterloo, IC Tape-out History, http://www.ece.uwaterloo.ca/~cdr/www/chip.html, incorporated herein by reference.) Thus, in this example, the overhead (six transistors) is much smaller than the resource saved (2080=104×20 transistors).

Since the classifier may require updates from time to time, programmability is another consideration when designing an example BP process. Since, however, updates of a classifier usually do not need to be very frequent (normally once every day or several days (See, e.g., www.snort.org, incorporated herein by reference). Therefore, one could use a field programmable gate array (FPGA) to implement the transformation module to permit the programmability expected to be required.

§4.2.1 Formal Definition of Block Permutation Problem

The block permutation problem may be formally defined as the following optimization problem:

BP Optimization Problem: For a given classifier $C_1$, suppose that P is the set of all possible series of permutations, find a series of permutations $P_1$ ($P_1 \in P$) to map $C_1$ to $C_2$, such that $|P_1|+|C_2|$ is minimized, i.e.

$$\arg\min_{P_1 \in P}(|P_1|+|C_2|),$$

where $|P_1|$ is the FPGA size required by $P_1$ and $|C_2|$ is the TCAM size required by $C_2$ (ignoring unit of measurement).

As mentioned in §4.2 above, the computation of $|P_1|$ can involve logic optimization, but the computation of $|C_1|$ is very straightforward. For example, if a given classifier $C_1$ contains N M-bit rules, then $|C_1|$=NM TCAM bits. It follows that:

$$\arg\min_{P_1 \in P}(|P_1|+|C_2|) \leq |C_1|.$$

This is because the classifier will not be changed if no permutation is done. In this case, $P_1=\emptyset$, $C_2=C_1$, $|P_1|+|C_2|=|C_1|$. Thus, this optimization problem is equivalent to a series of decision problems as below:

BP Decision Problem: For a given classifier $C_1$, suppose that P is the set of all possible series of permutations, check if there exists a series of permutations $P_1$ ($P_1 \in P$) to map $C_1$ to $C_2$, such that $|P_1|+|C_2|=k$ (k=1, ..., $|C_1|$), where $|P_1|$ is the FPGA size required by $P_1$, and $|C_1|$ and $|C_2|$ are the TCAM sizes required by $C_1$ and $C_2$ respectively.

By trying k from 1 to $|C_1|$ to solve the decision problems, by no more than $|C_1|$ times, the optimization problem can be solved. Unfortunately, however, each of these decision problems is very "hard" to solve. Even for a given series of permutations P, one cannot "quickly" verify the decision problem in "Polynomial-time" because the computation of |P| requires logic optimization which is known to be a NP-hard problem, taking exponential-time. (See, e.g., C. Umans, "Complexity of two-level logic minimization," *IEEE Transactions on Computer-Aided Design of Integrated Circuits and Systems*, 2006, incorporated herein by reference.) That is, the complexity of the logic optimization grows quickly (i.e., exponentially) as the dimension grows. For example, the Quine-McClusky algorithm (See, e.g., V. P. Nelson, "Digital Circuit Analysis and Design," Prentice Hall, 1995, incorporated herein by reference.) is a classic optimal solution for the logic optimization problem, but its run-time complexity is too high to support a large problem space.

It is possible to find the optimal solution using a Bruteforce method, but this is not practical. More specifically, block permutations only change the rule distribution; they don't add or delete any rule element. That is, regardless of the number of permutations performed, the only difference between $C_1$ and $C_2$ is the positions of rule elements. So one can draw a mapping table to record the location changes of rule elements. (Actually, a mapping table represents a series of special permutations, in which each permutation only switches two rule elements.) By trying all possible mapping tables, the optimal solution can be obtained. If the dimension (of Boolean Space, or how many bits in a rule) is L (i.e., if each rule has L bits), then the number of rule elements is $2^L$.

According to the mathematic theory of Permutations and Combinations, the number of mapping tables can be up to $(1*2* \ldots *2^L)=(2^L)!$. In packet classification rules, L=104. Consequently, for packet classification, the searching space may become prohibitively huge, in which case the Brute-force will be impractical.

In the following sections, a heuristic process to efficiently search approximation solutions is described.

§4.3 Terms and Concepts

Before introducing an example heuristic BP process, several terms and concepts are first defined below.

"Block" is defined as a hyper-rectangle in Boolean space.

"Block Size" is defined as the number of points that are contained in the block. For example, the size of the block "0*1*" in Table 2 560 of FIG. 5 is 4 points (i.e., 0010, 0011, 0110, 0111). To get the size of a block, one can simply examine the number of wildcards '*' in the block's Boolean representation. For example, since there are two wildcards in the Boolean representation of "0*1*", one can also say the size of block "0*1*" is 2 wildcards. (To simplify the description, this application uses the number of wildcards in the Boolean representation to denote the size of a block.) Clearly, the more wildcards there are in the Boolean representation, the larger the block size is.

The "distance" between two blocks (also referred to as "block distance") is defined as the distance of the two closest points in the two blocks. "Block distance" can be counted by the number of different, non-wildcard, counterpart bits in their Boolean representations. For example, the distance between the two points "0001" and "1101" is 2, because their W bits and X bits are different. In this case, the distance is determined by bits W and X. As another example, consider the two points "0*01" and "**00". First, the W bit and X bit are ignored because these positions contain a wildcard '*'. Note that there is only one different bit (i.e., the Z bit). So the "block distance" in this second example is 1. As yet another example, consider the points "0*01" and "01*1". First the X bit and Y bit are ignored because they contain wildcards. Since the W bit and Z bit in the two blocks are not different, their "block distance" is 0. If the "block distance" between two blocks is 0, the two blocks "overlap" in Boolean Space.

"Relative block direction" (also referred to as "Block direction") indicates how a block spans on different dimensions in Boolean Space. One can judge the direction of a block relative to another block using the positions of the wildcards in its Boolean representation. If the Boolean representations of two blocks have wildcards that all appear in the same bit positions, these two blocks are said to be in the same direction. For example, block "0*01" and block "0*10" are in the same direction, while block "0*01" and "*010" are not. Any two "points" in Boolean space (i.e. no wildcard in their Boolean representations), are always treated as in the same direction.

"Merging" is defined as directly combining two blocks into one block. In Boolean Space, if two blocks meet the condition of "Merging" in the table 800 of FIG. 8, they can be directly merged into one block. In the Table 800 of FIG. 8, "same action" means all rule elements in two blocks has the same action. Actually, "merging" is the result of logic optimization.

A "permutation" is specified by a pair of "Target Blocks" and a pair of "Assistant Blocks". A permutation operation includes two steps: first, switching the assistant blocks; second, merging the target blocks. The pair of target blocks and the corresponding pair of assistant blocks must satisfy the conditions of "Target Blocks" and "Assistant Blocks," respectively, in the table 800 of FIG. 8. Under the conditions, one and only one target block should be covered by one of the two assistant blocks. Consequently, when the assistant blocks are switched, one target block will be moved while the other will remain fixed. That is, the distance between two target blocks will be reduced to 1. Consequently, the target blocks can be merged. Referring back to Table 1 540 of FIG. 5 for example, assistant blocks "01" and "11" are switched in order to merge target blocks "0*01" and "0*10". (Note that "0*01" is covered by "**01".) Normally, to merge two target blocks, there might be more than one valid assistant block pair as options. For example, for target blocks "0*01" and "0*10" in Table 1 540 of FIG. 5, there is another valid pair of assistant blocks; "10" and "11". Note that the size of assistant blocks determines the transformation overhead.

§4.4 Compressing Classifiers With Example Bp Process

Figure 9:
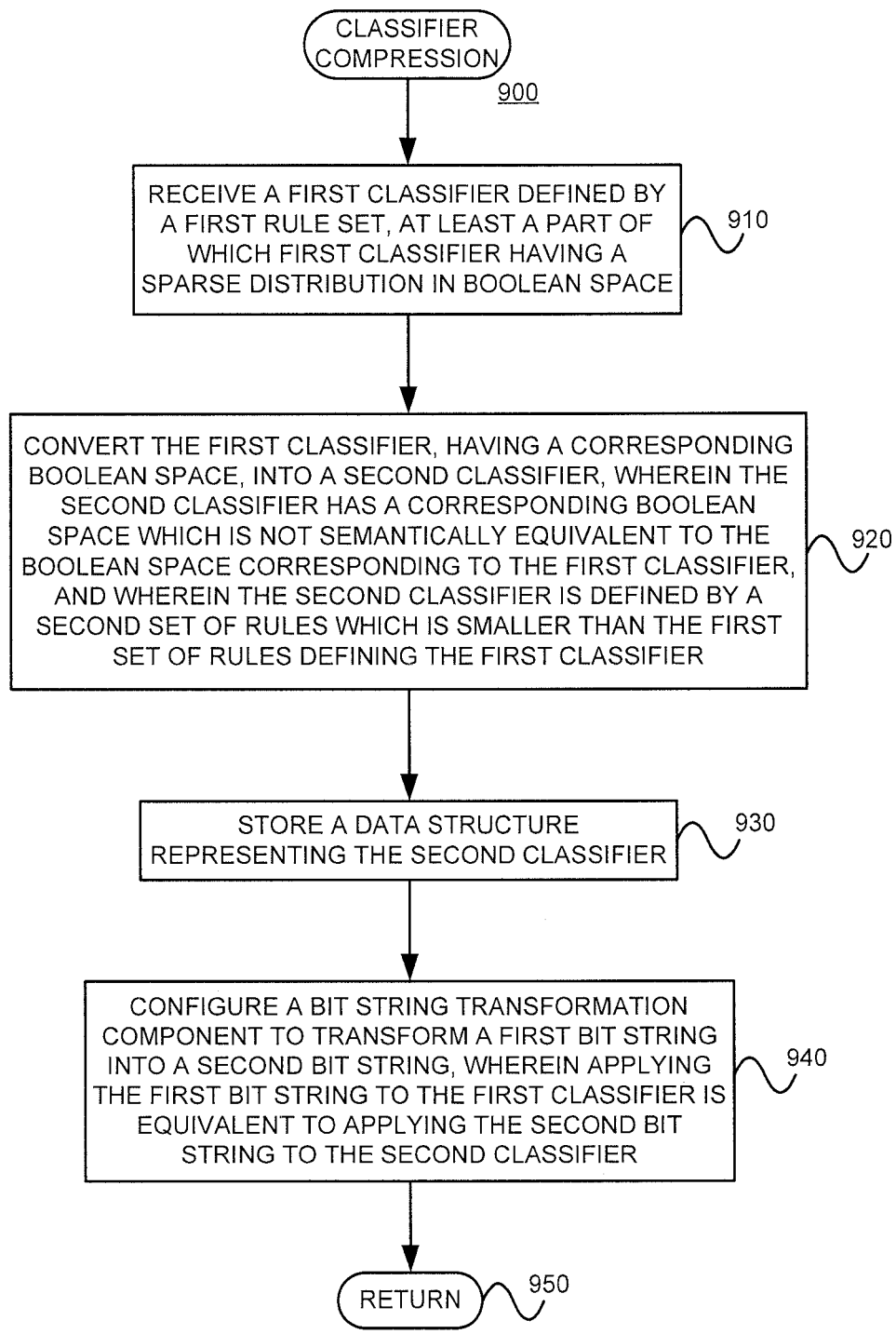
FIG. 9 is a flow diagram of an example method for performing classifier compression in a manner consistent with the present invention.

FIG. 9 is a flow diagram of an example method 900, consistent with the present invention, for providing an efficient physical implementation of a first classifier defined by a first rule set, at least a part of which first classifier having a sparse distribution in Boolean space. The method 900 receives the first classifier as an input. (Block 910). The method 900 then converts the first classifier, having a corresponding Boolean space, into a second classifier, wherein the second classifier has a corresponding Boolean space which is not semantically equivalent to the Boolean space corresponding to the first classifier, and wherein the second classifier is defined by a second set of rules which is smaller than the first set of rules defining the first classifier. (Block 920) A data structure representing the second classifier is then stored. (Block 930) Finally, a bit string transformation component to transform a first bit string into a second bit string, wherein applying the first bit string to the first classifier is equivalent to applying the second bit string to the second classifier, is configured (Block 940) before the method 900 is left (Node 950)

Figure 10:
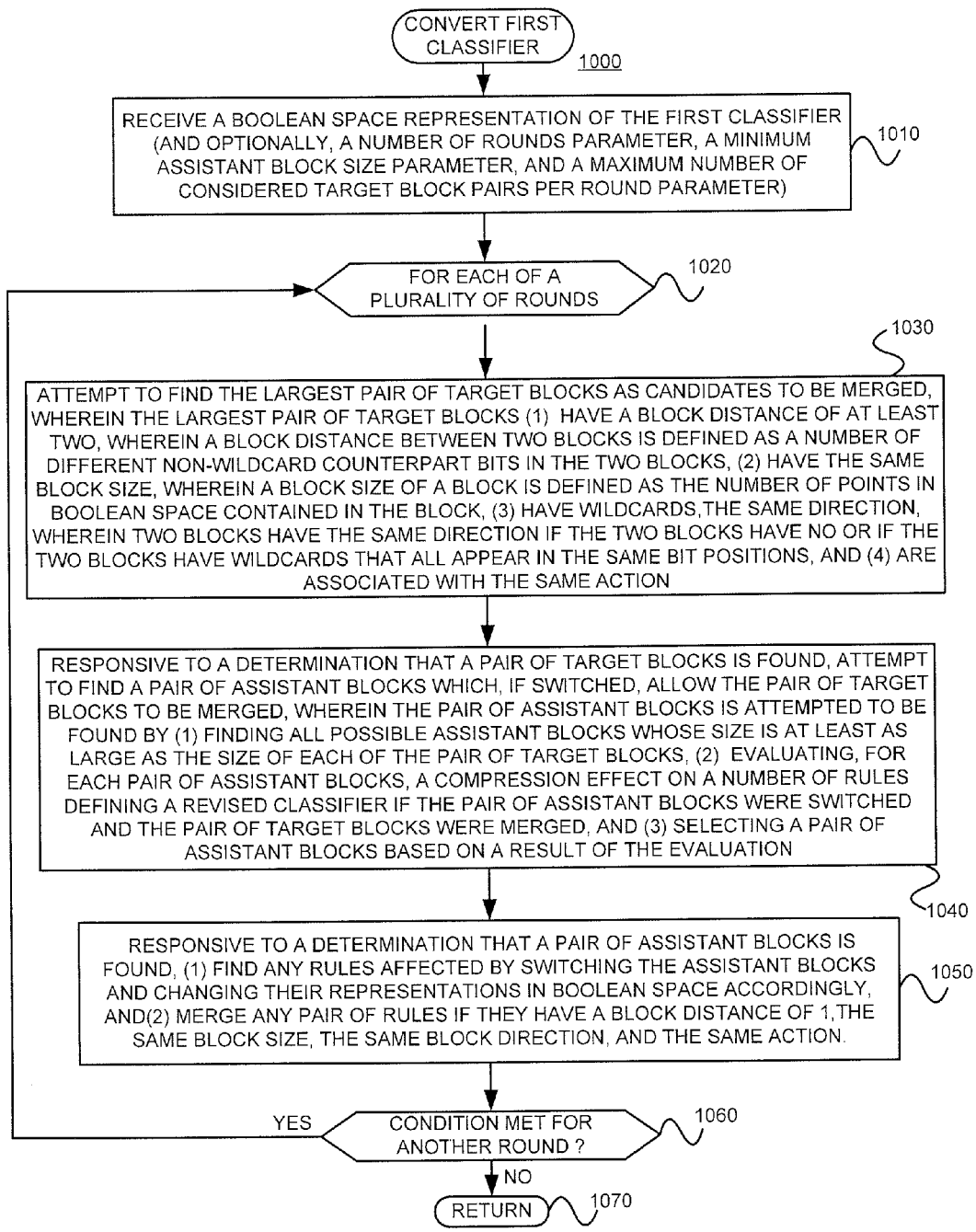
FIG. 10 is a flow diagram of an example method for converting a first classifier to a compressed classifier in a manner consistent with the present invention.

Referring back to block 920, FIG. 10 is an flow diagram of an example method 1000, consistent with the present invention, that may be used to convert the first classifier to the second classifier. In the following description of FIG. 10, a "block" is a hyper-rectangle in Boolean space, wherein each block corresponds to a rule of the first rule set defining the first classifier. The method 1000 receives a Boolean space representation of the first classifier as an input. (Block 1010) (Although not required, the method may also receive a number of rounds parameter, a minimum assistant block size parameter, and a maximum number of considered target block pairs per round parameter. For each of a plurality of rounds (Loop 1020-1060), the method 1000 performs the following acts. First, the method 1000 attempts to find the largest pair of target blocks as candidates to be merged, wherein the largest pair of target blocks (1) have a block distance of at least two, wherein a block distance between two blocks is defined as a number of different non-wildcard counterpart bits in the two blocks, (2) have the same block size, wherein a block size of a block is defined as the number of points in Boolean space contained in the block, (3) have wildcards, the same direction, wherein two blocks have the same direction if the two blocks have no or if the two blocks have wildcards that all appear in the same bit positions, and (4) are associated with the same action. (Block 1030) Responsive to a determination that a pair of target blocks is found, the method 1000 then attempts to find a pair of assistant blocks which, if switched, allow the pair of target blocks to be merged, wherein the pair of assistant blocks is attempted to be found by (1) finding all possible assistant blocks whose size is at least as large as the size of each of the pair of target blocks, (2) evaluating, for each pair of assistant blocks, a compression effect on a number of rules defining a revised classifier if the pair of assistant blocks were switched and the pair of target blocks were merged, and (3) selecting a pair of assistant blocks based on a result of the evaluation. (Block 1040) Finally, responsive to a determination that a pair of assistant blocks is found, the method 1000 (1) finds any rules affected by switching the assistant blocks and changing their representations in Boolean space accordingly, and (2) merges any pair of rules if they have (a) a block distance of 1, (b) the same block size, (c) the same block direction, and (d) the same action.

Referring back to block 1010, in at least some examples of the method 1000, a minimum assistant block size parameter is received as an input. This parameter can help reduce processing time and/or reduce the logic needed for the bit string transformation component. However, at the extreme case, assistant block size parameter may be one.

Referring back to FIG. 9, in at least some examples of the method 900, first bit string includes packet header information. (Recall, e.g., FIG. 1.)

Referring back to FIG. 9, in at least some examples of the method 900, a cost function corresponding to programmable logic implementing the bit string transformation component is less than a difference in cost functions of a TCAM implementation of the first classifier and a TCAM implementation of the second classifier. In some of these examples, the cost function may be a function of a number of transistors.

Referring back to FIG. 9, in at least some examples of the method 900, the first classifier consists of a rule set defining binary actions. In other examples of the method 900 of FIG. 9, the first classifier consists of a rule set defining n-ary actions, where n is greater than two.

Figure 11:
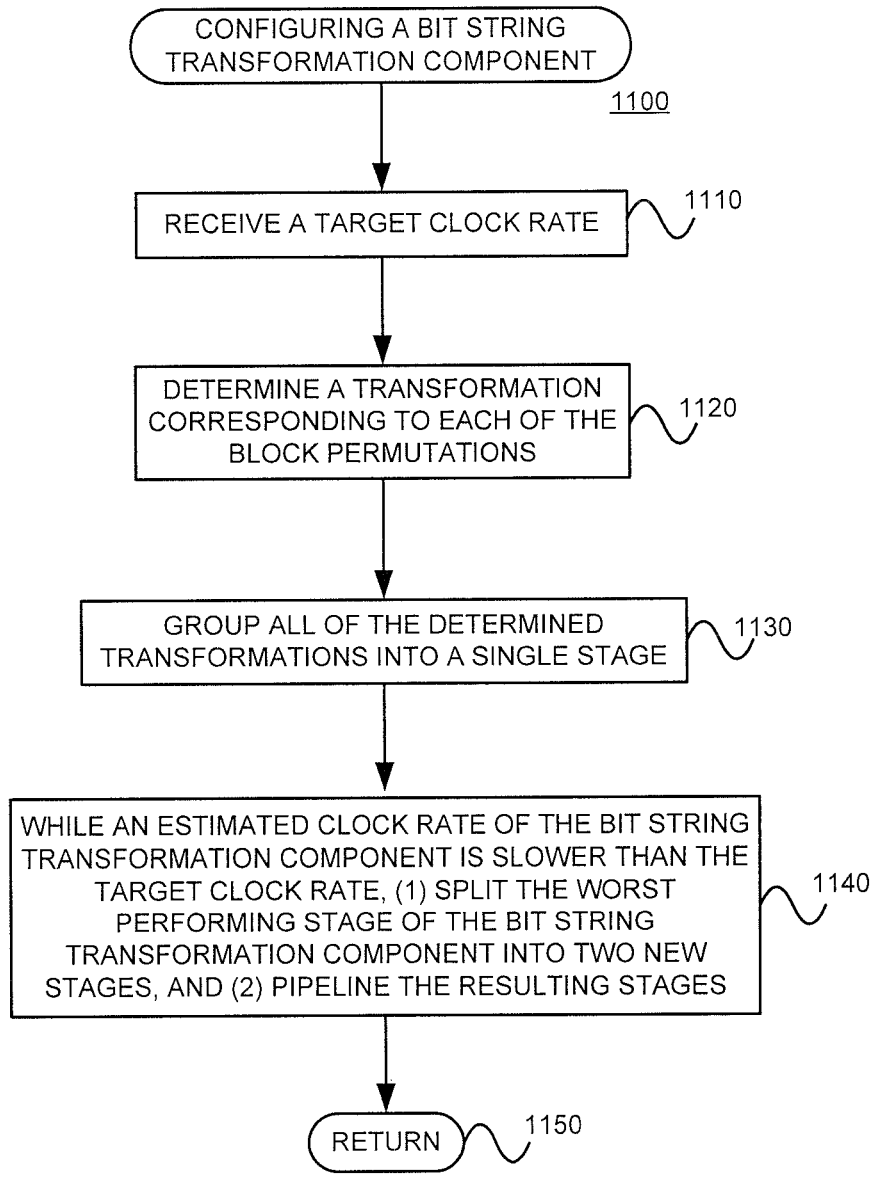
FIG. 11 is a flow diagram of an example method for configuring a bit string transformation component in a manner consistent with the present invention.

Referring back to block 940, FIG. 11 is an flow diagram of an example method 1100, consistent with the present invention, that may be used to configure a bit string transformation component. In the following description of FIG. 11, a "block" is a hyper-rectangle in Boolean space, each block corresponds to a rule of the first rule set defining the first classifier, and the act of converting the first classifier into a second classifier (Recall Block 920) includes a series of block permutations. Referring now to FIG. 11, a target clock rate is received as an input. (Block 1110) A transformation corresponding to each of the block permutations is then determined. (Block 1120) All of the determined transformations are then grouped into a single stage. (Block 1130) Finally, while an estimated clock rate of the bit string transformation component is slower than the target clock rate, the method 1100 splits the worst performing stage of the bit string transformation component into two new stages, and pipelines the resulting stages. (Block 1140) When the estimated clock rate of the bit string transformation component is no longer slower than the target clock rate, the method 1100 is left. (Node 1150)

§4.4.1 Detailed Heuristic Process for Compressing Classifiers

§4.4.1.1 Properties of "Assistant Blocks"

Before presenting an example detailed heuristic BP process, a series of properties of assistant blocks that may be used to narrow down the searching space, thereby reducing the computation complexity, is introduced.

Property 1: If there are multiple pairs of candidate assistant blocks for a given pair of target blocks, to minimize the transformation overhead, one should choose the largest assistant blocks to switch. This property is useful because switching small blocks causes more overhead than switching big blocks. This is because small blocks have less wildcards in the Boolean representations and consequently involve more non-wildcard bits into the transformations. For example, in the Permutation 2 of FIG. 5, "01" and "11" are chosen as a pair of assistant blocks. As a result, the overhead is one XOR gate. However, consider what would happen if one another pair of smaller assistant blocks (e.g., 0*01" and "0*11") was chosen instead. An additional one OR gate and two AND gates would be needed besides one XOR gate. As this example illustrates, to reduce the overhead, there should be a preference to choose larger blocks to switch when doing the permutation operations. The method 1000 of FIG. 10 may be modified to accommodate this preference, as will be apparent in the following.

Property 2: Assuming that the size of an assistant block is Wp wildcards, the size of its corresponding target block is Wt wildcards, the distance between the two target blocks is D and the dimension of Boolean Space is L (i.e. each rule contains L bits), there exists the following relationship:

$$W_t \leq Wp \leq (L-D)$$

Property 2 is explained using Lemma 1 through 3, as follows.
Lemma 1: $Wp \geq W_t$.
Proof: Lemma 1 discloses the lower bound of assistant block size. According to the table 800 of FIG. 8, there must be an assistant block fully covering a target block (because the former is needed to carry the later in the permutation to reduce the distance between the pair of two target blocks.) For example, in Table 1 520 of FIG. 5, the assistant block "**01" covers the target block "0*01". Accordingly, the size of the assistant block cannot be less than the size of the target block.
Lemma 2: $Wp \leq (L-D)$.
Proof: Lemma 2 defines the upper bound of assistant block size. This upper bound can be understood from the Boolean representations of target blocks and assistant blocks. Without loss of generality, the table 1200 of FIG. 12 is used to illustrate how to find a pair of assistant blocks for a given pair of target blocks by deducing the Boolean representations. Lemma 2 follows from this example.

As shown in FIG. 12, there is a pair of target blocks (i.e. Target Block 1 and Target Block 2). Without loss of generality, assume Target Block 1 and Target Block 2 have wildcards in bit positions $W_1, \ldots, W_M$, same values in bit positions $X_1, \ldots, X_N$, and different values in bit positions $Y_1, \ldots, Y_D$. Apparently, bit positions $Y_1, \ldots, Y_D$ determine the distance between Target Block 1 and 2, which is D in this case. To merge these two target blocks, a permutation is needed to reduce their distance to 1. In the permutation, (D−1) bits among $Y_1, \ldots, Y_D$ of one target block need to be inversed. Without loss of generality, assume $Y_1, \ldots, Y_{D-1}$ of Target Block 1 will be inversed by switching two assistant blocks. The result is shown in Block 1 of FIG. 12. According to the table 800 of FIG. 8, one of the assistant blocks must cover Target Block 1. Assume that Assistant Block 1 will cover Target Block 1. To maximize the size of Assistant Block 1, with regarding to Property 1 and Lemma 1, one can populate wildcards to its $W_1, \ldots, W_M$ bits and $X_1, \ldots, X_N$ bits and finally get its Boolean representation. (Note that none of $Y_1, \ldots, Y_D$ bits of Assistant Block 1 can be wildcard (as will be proven it in Lemma 3).) Assume that the assistant block to be switched with Assistant Block 1 is Assistant Block 2. The Boolean representation of Assistant Block 2 can be obtained by simply inversing $Y_1, \ldots, Y_{D-1}$ bits of Assistant Block 1. By now, the largest pair of assistant blocks is determined. From their Boolean representations, notice that the maximum assistant block size is $(M+N)=(L-D)$ wildcards.

Lemma 3: None of $Y_1, \ldots, Y_D$ bits of Assistant Block 1 in FIG. 12 can be wildcard.
Proof: This lemma is proven by contradiction. If wildcard appears in any bit of $Y_1, \ldots, Y_{D-1}$, e.g. in $Y_1$ of Assistant Block 1(a) in FIG. 12, Target Block 1 will be transformed to Block 1(a). Since the distance of Block 1(a) and Target Block 2 is not 1, these blocks cannot be directly merged. If there is a wildcard in $Y_D$, as shown in Assistant Block 1(b) and Assistant Block 2(b), then Target Block 1 and Target Block 2 will both be moved and turned to Block 1(b) and Block 2(b) respectively. Block 1(b) and Block 2(b) cannot be directly merged either. So far, we have proved Lemma 3.

Property 3 (Extension of Property 2): In packet classification, it holds that:

$$0 \leq Wp \leq (L-2) = 102$$

In packet classification, L=104. According to table 800 of FIG. 8, D≥2. So, $W_p \leq (L-D) \leq (L-2) = 102$. In Boolean Space, a block should at least contain one rule element. Therefore, $W_p \geq W_t \geq 0$ wildcards.

§4.4.1.2 Example Heuristic Classifier Compression

Details of a heuristic BP process to compress classifiers are now described. The following detailed example provides a practical process having a reduced computational complexity as compared with the NP-hard solution. The example process finds an approximate solution by taking advantage of the properties and lemmas discussed in §4.4.1.1 above, as well as some predefined parameters. The following is pseudo code for performing this process.

```
1.   Function BP_CLASSIFIER_COMPRESS(C₀,Nᵣ,Wₘᵢₙ,Nₜₚ)
2.   Input:
3.       Original classifier C₀ in L-dimension Boolean Space;
4.       Number of rounds Nᵣ;
5.       Minimum assistant block size Wₘᵢₙ (wildcards);
6.       Maximum number of target block pairs to be
             considered in each round Nₜₚ;
7.   Output:
8.       Compressed classifier C₁;
9.   Constant:
10.      Maximum assistant block size Wₘₐₓ = (L − 2);
11.  Variable:
12.      A set of target block pairs ST₁;
13.      A pair of assistant blocks A₁;
14.  Begin
15.      C₁ = PREPROCESSING(C₀);
16.      for round = 0 to (Nᵣ − 1) do
17.          for Wₚ = Wₘₐₓ to Wₘᵢₙ do
18.              ST₁ = ∅; A₁ = ∅;
19.              ST₁ = FIND_TARGET(C₁, Wₚ, Nₜₚ);
20.              if ST₁ ≠ ∅ then
21.                  A₁ = FIND_ASSISTANT(C₁, Wₚ, ST₁);
22.              end if
23.              if A₁ ≠ ∅ then
24.                  C₁ = EXECUTE_PERM(C₁, A₁);
25.                  break;
26.              end if
27.          end for
28.          if A₁ == ∅ then
29.              return C₁;
30.          end if
31.      end for
32.      return C₁;
33.  End
```

As shown, the BP_CLASSIFER_COMPRESS pseudo code reads in a classifier as input and then recursively finds and performs permutations. After a predefined number of rounds of iterations have been completed, it will output a compressed classifier. The overall process consists of two phases: a preprocessing phase (line 15) and a permutation phase (lines 16-32).

In the preprocessing phase, known logic optimization (recall McGeer) is applied on the original classifier to group adjacent rule elements. This preprocessing will reduce the number of rules that will be involved in the permutation phase, thereby reducing the computation complexity.

In the permutation phase, permutations are recursively found and performed on the classifier. The parameter $N_r$ is used to control the number of iteration rounds. (There are other ways to limit the number of iterations.) The expectation is to find and execute only one permutation in each round (each iteration). After the process is completed, there will have been executed a series of permutations. Since each permutation requires a pair of target blocks and a pair of assistant blocks, in each round, three steps are used to find target blocks (line 19), find assistant blocks (lines 20-22) and execute the permutation found (lines 23-26).

Recall from Property 1 that a larger assistant block leads to smaller overhead. Consequently, it is beneficial to choose the largest possible assistant blocks. To accomplish this, in each round/iteration, the process starts from the largest possible blocks, whose size may be defined by $W_{max}$ based on Property 3 (line 9), and, if necessary, continues to the smallest allowed blocks, whose size may be defined by a predefined factor $W_{min}$. That is, if a permutation cannot be found under a current constraint of assistant block size, a next smaller size is tried, until reaching $W_{min}$. The pseudo code terminates when either (a) the process has run for $N_r$ rounds, or (b) the process cannot find a valid pair of assistant blocks to switch in the current round.

The three functions—FIND_TARGET, FIND_ASSISTANT, and EXECUTE PERM—called in each round of the permutation phase are now described in §§4.4.1.2.1-4.4.1.2.3 below.

§4.4.1.2.1 Example Find_Target Function

The following is pseudo code for performing an example FIND_TARGET function.

```
1.   Function FIND_TARGET(C₁, Wₚ, Nₜₚ)
2.   Input:
3.       A Classifier C₁ with N₁ rules in L-dimension Boolean
         Space;
4.       Expected assistant block size Wₚ (wildcards);
5.       Maximum number of target block pairs to be
         considered in each round Nₜₚ;
6.   Output:
7.       A set of target block pairs ST₁;
8.   Begin
9.       ST₁ = ∅; M = 0;
10.      for rule i = 0 to (N₁ − 1) do
11.          for rule j = i + 1 to (N₁ − 1) do
12.              if Pair(i, j) cannot be a pair of target blocks then
13.                  break;
14.              end if
15.              if the sizes of rule i and j are larger than Wₚ then
16.                  break;
17.              end if
18.              if the distance D(i, j) ≠ (L − Wₚ) then
19.                  break;
20.              end if
21.              ST₁ = ST₁ + Pair(i, j); M = M+1;
22.              if M == Nₜₚ then
23.                  return ST₁;
24.              end if
25.          end for
26.      end for
27.      return ST₁;
28.  End
```

The example FIND_TARGET function operates to find out all possible target block pairs based on the input parameters. As shown, it examines all rule pairs to check (1) if a rule pair meets the conditions of "Target blocks" in table 800 of FIG. 8 (lines 12-14); (2) if their sizes satisfy Property 2 (i.e., not larger than $W_p$, as shown in lines 15-17); (3) if their distance satisfies Property 2 (Actually, based on Lemma 4, described below, the process only needs to determine if it is equal to $(L-W_p)$, as shown in lines 18-20.). Only if a pair of rules meets all these three constraints does the process consider them as a pair of target blocks. These three conditions can largely reduce the number of target block pairs that need to be considered in each round/iteration, thereby reducing the computational complexity of the process. The parameter of $N_{tp}$ may also be used to limit the number of target block pairs. If there are too many target blocks found, only report the first $N_{tp}$ pairs are returned.

Lemma 4: In FIND_TARGET function, constraints $D=(L-Wp)$ and $D \leq (L-Wp)$ are equivalent in finding permutations. To reduce the computation complexity, we can only consider the target block pairs that satisfy $D=(L-Wp)$.

Proof: According to Property 2, $Wp \leq (L-D)$, which can be rephrased as $D \leq (L-W_p)$. Suppose that there are two pairs of target blocks $t_{pair1}$ and $t_{pair2}$ in the current input classifier $C_1$. Suppose the block distances in $t_{pair1}$ and $t_{pair2}$ are $D_1$ and $D_2$, respectively. Without loss of generality, assume $D_1 < D_2$. Since $W_p$ may be gradually decreased when searching target blocks, if the constraint is set as $D=(L-W_p)$, the process will return $t_{pair1}$ when $W_p$ goes down to satisfy $W_p=(L-D_1)$; if the constraint is set as $D \leq (L-W_p)$, when $W_p=(L-D_1)$, $W_p>(L-D_2)$, which violates Lemma 2. Therefore $t_{pair2}$ will not be returned, only $t_{pair1}$ will be returned. If assistant blocks for $t_{pair1}$ can be found, the process will execute a permutation and get a new classifier to be processed in the next round/iteration. If, however, assistant blocks for $t_{pair1}$ cannot be found, the process will continue to decrease $W_p$ and eventually report $t_{pair2}$, no matter the constraint is $D=(L-W_p)$ or $D \leq (L-W_p)$. So far, regardless of whether the constraint is set to $D \leq (L-W_p)$ or $D=(L-W_p)$, the same result is always returned. Hence, Lemma 4 is proved.

§4.4.1.2.2 Example Find_Assistant Function

The following is pseudo code for performing an example FIND_TARGET function.

```
1.   Function FIND_ASSISTANT(C₁, Wₚ, ST₁)
2.   Input:
3.       A Classifier C₁;
4.       Expected assistant block size Wₚ (wildcards);
5.       A set of target block pairs ST₁;
6.   Output:
7.       A pair of assistant blocks A₁;
8.   Variable:
9.       Sets of Assistant block pairs SA₁ and SA₂;
10.  Begin
11.      SA₁ = ∅;
12.      for each pair of target blocks t_pair ∈ ST₁ do
13.          SA₂ = ∅;
14.          SA₂ = SUB_FIND_ASSIST(C₁, Wₚ, t_pair);
15.          SA₁ = SA₁ + SA₂;
16.      end for
17.      A₁ = SUB_EVALUATE_ASSIST(SA₁);
18.      return A₁;
19.  End
```

If the target block set returned by the FIND_TARGET function is not empty, the example BP process will continue to run the FIND_ASSISTANT function to find the corresponding assistant block pairs. As shown above, the FIND_ASSISTANT function may be used to find all possible assistant blocks whose size is equal to the input parameter $W_p$ for each pair of target blocks (lines 12-16). Then it will evaluate the compression effect of each pair of assistant blocks and choose the one that can reduce most number of rules (line 17).

The function of finding assistant blocks for a given pair of target blocks is implemented in the SUB_FIND_ASSIST sub-function (Line 14). Basically, the goal of this sub-function is to deduce the Boolean representations of assistant blocks from the Boolean representations of the given target blocks. (This method has been shown in the proof of Lemma 2.) According to Lemma 5, one can find $2*(L-W_p)$ pairs of assistant blocks for a given target block pair.

Lemma 5: In the SUB_FIND_ASSIST sub-function, one can exactly find $2*(L-Wp)$ pairs of assistant blocks for each given target block pair.

Proof: Without loss of generality, the examples in FIG. 12 are used to prove this Lemma. When the distance of two target blocks is D bits, (D−1) bits among $Y_1, \ldots, Y_D$ bits in one of the target blocks needs to be inversed to shorten their distance to 1. There are 2D possible operations. A pair of assistant blocks can be obtained in correspondence to each of possible inversing operations. According to Lemma 4, $D=(L-W_p)$. Exactly $2D=2*(L-W_W)$ pairs of assistant blocks can be found.

The SUB_EVALUATE_ASSIST function (line 17) may be used to evaluate all the assistant block pairs and chooses the "best" one. There are two situations that should be considered when switching a pair of assistant blocks in a permutation. First, switching a pair of assistant blocks may merge more than one pair of target blocks. Consequently, a permutation can reduce multiple rules. For example, Permutation 1 in FIG. 5 can reduce two rules. Second, a permutation may also "break" some existing blocks, leading to more rules. The following metric, called "delta", is defined to evaluate assistant blocks. A pair of assistant blocks can be chosen only if its delta is a positive number.

delta=# of rules reduced−# of rules created

Figure 13:
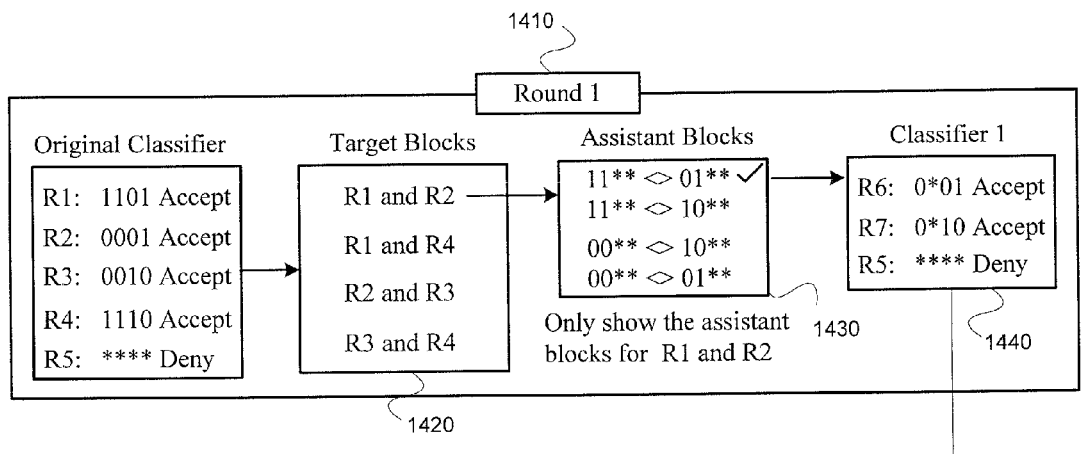
FIG. 13 illustrates an example of evaluating assistant blocks in a manner consistent with the present invention.

To estimate the number of rules reduced for a given pair of assistant blocks, all possible rule pairs in current classifier are checked to see if any of them can be a target block pair of the given assistant blocks, based on the conditions in table 800 of FIG. 8. To estimate the number of rules created, all the rules in current classifier can be scanned to see if any wildcard in their Boolean representations would be affected by switching the given assistant blocks. FIG. 13 is an example of evaluating assistant blocks. In this example, four pairs of assistant blocks are listed for target blocks R1 and R2. All these assistant blocks can merge R1 and R2, resulting in one rule reduced. However, among these assistant blocks, A1 and A3 will split R3 and create two rules, while A2 and A4 don't. For example, R3 is made up of "1110" and "1100". If A1 is chosen to switch, then "1100" will be changed to "1101", which can't be merged with "1110", resulting in two new blocks while R3 disappears. So, A2 or A4 is chosen instead.

§4.4.1.2.3 Example Execute_Perm Function

The function of EXECUTE_PERM (line 24 in the BP_CLASSIFER_COMPRESS pseudo code) is the last step of each round/iteration. This function will be called to execute a permutation if the previous step can return a pair of assistant blocks. To execute a permutation, the example process may (1) scan the current classifier to change the Boolean representations of the rules affected by switching assistant blocks, and (2) compare rules with each other. If any pair of rules meets the condition of "Merging" in table 800 of FIG. 8, then they are merged into one rule.

Figure 14:
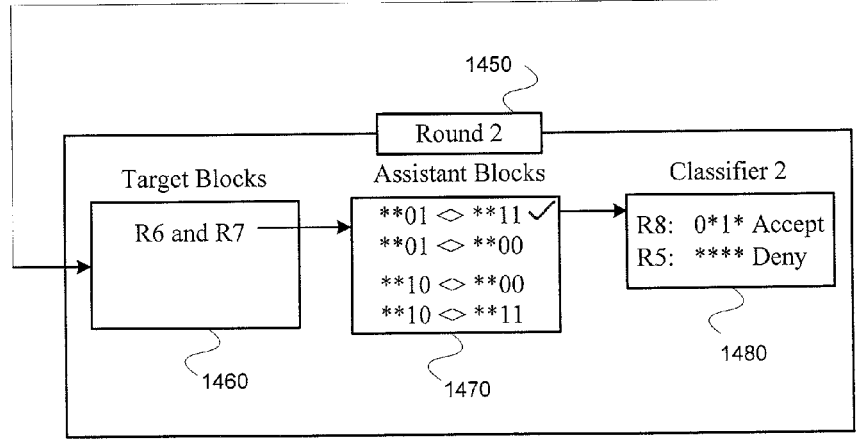
FIG. 14 is an example of applying two rounds of a compression method consistent with the present invention, to an example original classifier.

FIG. 14 illustrates, in detail, how the example process works on the example in FIG. 5. In this example, the dimension of Boolean Space L is 4. Based on Property 3, an assistant block size $W_p$ from 2 wildcards to 0 wildcard in each round is tried. In this example, the process is completed at the end of two rounds. In the first round 1410, when $W_p=2$, four pairs of target blocks 1420 and sixteen pairs of assistant blocks (only four pairs of assistant blocks associated with the first target block pair are shown in FIG. 14 for simplicity) 1430 are found. Since the four assistant block pairs 1430 illustrated can provide the same delta, one pair (e.g., "11<>01") may be selected in an arbitrary manner (e.g., randomly). The permutation is executed and the compressed Classifier 1 1440 is obtained. In the second round 1450, when $W_p=2$, only one pair of target blocks 1460 and four pairs of assistant blocks 1470 are found. Since all the four pairs of assistant blocks contribute the same delta, one pair (e.g., "01<>11") is arbitrarily (e.g., randomly) selected. The permutation is executed and the further compressed Classifier 2 1480 is obtained as the final output.

§4.4.1.2.4 Time Complexity of the Example Heuristic Classifier Compression

As discussed above in §4.2.1, to get an optimal solution, the Block Permutation problem is NP hard and cannot be solved in polynomial time. The proposed example heuristic classifier compression process can provide sub-optimal compression results with a relatively low run-time complexity. On one hand, the example process can provide sub-optimal results, because (1) it searches assistant blocks starting from the largest possible size $W_{max}=(L-2)$ to make sure the transformation overhead is as small as possible; (2) it caps the minimum assistant block size $W_{min}$ so that the overhead involved in each transformation can be bounded; and (3) it uses the delta metric to ensure that each permutation can actually reduce rules. On the other hand, the run-time complexity of example process is limited because: (1) unlike the Brute-force process which does not consider rule distribution, the example process is sensitive to the rule distribution (If the rule distribution is dense, a case that is not necessary to apply the example process for compression, the example process will finish quickly.); (2) a series of properties and lemmas is used to reduce the computation; and (3) run-time complexity of the example process may be limited by introducing the parameters of $N_r$ and $N_{tp}$.

The following considers the worst case run-time complexity of the example process (BP_CLASSIFIER_COMPRESS). Suppose that the classifier (after preprocessing phase) contains N rules. The worst case run-time of the example process is:

$$T_{BP} = \sum_{i=0}^{N_r-1} [(W_{max} - W_{min} + 1)(T_1(i) + T_2(i)) + T_3(i)] <$$

$$\sum_{i=0}^{N_r-1} [L(T_1(i) + T_2(i)) + T_3(i)]$$

Where, L is constant; $T_1(i)$, $T_2(i)$ and $T_3(i)$ is the worst case run-time of FIND_TARGET, FIND_ASSISTANT and EXECUTE_PERM in $i^{th}$ round, respectively. Please note that EXECUTE_PERM is called only once because only one permutation is executed in each round.

In worst case, each round can only reduce one rule, so in the $i^{th}$ round, the number of rules is $N_1(i)=N-i$; and the number of rule pairs is $N_2(i)=N_1(i)(N_i(i)+1)/2$.

Since L is constant, the run-time complexity of checking the Boolean representation of a rule can be considered as a constant value. So, the worst case run-time of FIND_TARGET is:

$$T_1(i)=0(N_2(i))$$

For FIND_ASSISTANT, based on Lemma 5, the number of assistant block pairs found is $N_3(i)=2(L-W_p)N_{tp}<2LN_{tp}$.

From the proof of Lemma 5, the run-time of lines 12-16 of the FIND_ASSISTANT pseudo code is $T_{21}(i)<2LN_{tp}$. The run-time of SUB_EVALUATE_ASSIST in line 17 of the FIND_ASSISTANT pseudo code is $T_{22}(i)=0(N_2(i))N_3+0(N_1(i))N_3(i)$. So, the worst case run-time complexity of FIND_ASSISTANT is:

$$T_2(i)=T_{21}(i)+T_{22}(i)<(0(N_1(i)+N_2(i))+1)2LN_{tp}$$

The worst case run-time of EXECUTE_PERM is:

$$T_3(i)=0(N_1(i))+0(N_2(i))=0(N_1(i)+N_2(i))$$

Based on the foregoing analysis, the worst case run-time of the BP_CLASSIFIER_COMPRESS pseudo code is:

$$T_{BP}=N_rN_{tp}0(N^2)$$

This means that once the $N_r$ and $N_{tp}$ have been decided, the worst case run-time complexity of BP algorithm is $0(N^2)$.

§4.4.2 Example Process for Implementing Transformations Corresponding to the Permutations As explained above, when the classifier is compressed by a series of permutations, corresponding transformations on the incoming bit string (e.g., packet headers) must be applied before applying them to the compressed (e.g., TCAM) classifier. Circuit size and throughput performance are the two major performance metrics that should be considered when implementing the transformation logic. First, basic methodology of designing the transformation logic circuit, without considering throughput performance, is described in §4.4.2.1. Then, an example stage-grouping process to achieve a tradeoff between circuit size and throughput is described in §4.4.2.2.

Figures 15, 16:
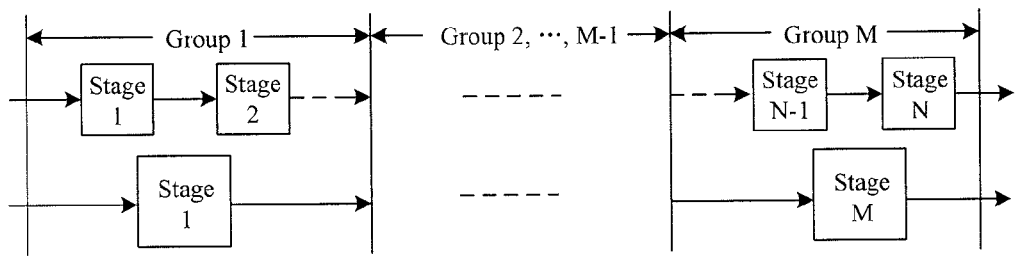
FIG. 15 illustrates Boolean equations of the two transformations illustrated in FIGS. 5(a) and 5(b).
FIG. 16 illustrates grouping stages of a pipeline in a bit transformation module consistent with the present invention.

§4.4.2.1 Basic Methodology for Implementing Transformations Corresponding to the Permutations In a case in which performance is not considered, a circuit can be optimized (i.e., its size can be minimized) by deducing and simplifying the final Boolean equations for a series of transformations. For example, FIG. 15 provides the Boolean equations of the two transformations used in FIG. 5. Notice that each equation in a transformation can always be implemented by one XOR gate. Given an incoming packet header, the transformed values of W, X, Y, and Z bits can be calculated by using the two equations in series. The equations of Transformation (1) can be substituted into those of Transformation (2) to obtain a single set of final equations. With this set of final equations, the transformed value of the bit string (e.g., packet header) can be directed calculated.

For a general case, there is a method to easily deduce the final equations. suppose that in a permutation, two assistant blocks which have same value in bit positions $X_1, \ldots, X_m$, have different value bit positions $Y_1, \ldots, Y_n$ and have wildcards in other bit positions are switched. Their Boolean representations are denoted as "$a_1 \ldots a_m b_1 \ldots b_n * \ldots *$" and "$a_1 \ldots a_m \overline{b_1} \ldots \overline{b_n} * \ldots *$" ("$\overline{b}$" is the inverse of "b"). In the corresponding transformation, only $Y_1, \ldots, Y_n$ bits of the incoming packet header will be changed. Assuming that the value of $X_1, \ldots, X_m, Y_1, \ldots, Y_n$ bits of the incoming packet header is $c_1, \ldots, c_m, d_1, \ldots, d_n$ respectively, and after the transformation, their $Y_1, \ldots, Y_n$ bits will be changed to $d_1', \ldots, d_n'$ respectively, the following Boolean equations are used to calculate the new values of $Y_1, \ldots, Y_n$ bits.

$$\begin{cases} d_1' = \overline{d_1} \cdot F + d_1 \cdot \overline{F} \\ \vdots \\ d_n' = \overline{d_n} \cdot F + d_n \cdot \overline{F} \end{cases}$$

Where, F=1 if $c_1 \ldots c_m = a_1 \ldots a_m$ and $d_1 \ldots d_m = b_1 \ldots b_n$ or $\overline{b_1} \ldots \overline{b_n}$; Otherwise, F=0.

§4.4.2.2 Stage-Grouping Methodology for Implementing Transformations Corresponding to the Permutations For a given series of transformations, a pipeline structure can be used to implement them in circuits. For example, if there are N transformations, an N-stage pipeline can be provided, with each stage implementing one transformation. A packet needs to traverse N stages with a delay of N clock cycles before entering the TCAM for the classification. Because each stage is simple enough, the pipeline can run at a high clock rate thus provide a high throughput. One downside of using this pipeline stage is that it usually requires large hardware resource.

An alternative solution to the pipeline is to use a combinational logic to implement all N permutations. This structure is a 1-stage pipeline solution, which is actually the same as the basic methodology that was just describe above in §4.2.2.1. Normally, a 1-stage pipeline requires much less hardware resources than an N-stage pipeline because the Boolean equations can be simplified. However, the relatively high critical path delay, which would lower the clock rate, is an important concern when using a 1-stage solution.

Given the limitations of both 1-stage and N-stage structures, a stage-grouping process, such as that described with respect to FIG. 11 above, which can find the best number of stages to achieve a tradeoff between the cost and the speed may be used. As shown in FIG. 16, consecutive pipeline stages are grouped together to reduce the number of pipeline stages. Each new stage implements multiple transformations and the new Boolean function of each new stage can be derived by using the basic methodology described in §4.2.2.1 above.

Pseudo code of an example of stage-grouping process is as follows.

| | |
|---|---|
| 1. | Methodology Stage-Grouping($P_1, P_1, \cdots, P_N, R_t$) |
| 2. | Input: |
| 3. |     A series of transformations $P_1, P_1, \cdots, P_N$; |
| 4. |     Targeted clock rate $R_t$; |
| 5. | Output: |
| 6. |     A M-stage pipeline; |
| 7. | Variable: |
| 8. |     Current number of stages M; |
| 9. |     Current clock rate R; |
| 10. | Begin |
| 11. |     R = 0; |
| 12. |     Group all transformations in one stage and construct 1-stange pipeline; |
| 13. |     M = 1; |
| 14. |     while ($R < R_t$) do |
| 15. |         Synthesize pipeline, identify the worst-performance stage $S_w$ and get R; |
| 16. |         if ($R < R_t$) then |
| 17. |             Evenly split stage $S_w$ to two new stages and construct (M + 1) -stange pipeline; |
| 18. |             M = M + 1; |
| 19. |         end if |
| 20. |     end while |
| 21. |     return a M-stage pipeline; |
| 22. | End |

The stage-grouping process starts from a 1-stage pipeline. In other words, all transformations are first merged into a single stage. Then the result is synthesized to estimate the clock rate performance. If the estimated clock rate is faster than the targeted clock rate, the obtained pipeline will be accepted and the stage-grouping process will end. Otherwise, the stage may be evenly split (or split as evenly as possible) into two new stages. A new two-stage pipeline is constructed and synthesized. If the clock rate meets the requirement, this pipeline is accepted. Otherwise, the worst-performing stage is evenly split (or split as evenly as possible) into two new stages again. The new three-stage pipeline is constructed and synthesized. This process is repeated until a pipeline that can work at the targeted clock rate (while requiring only a relatively small number of stages) is obtained.

When splitting a stage, the two new stages are preferably of equal size. Given Property 1, the assistant block size determines the size of a transformation. The present inventors recognized that there is a way to evenly split a stage based on the assistant block sizes of all transformations in the stage. For example, if a stage incorporates k (k>1) consecutive permutations whose assistant block sizes are $s_1, \ldots, s_k$ respectively, the $t(1 \leq t < k)$, such that $\Sigma_{i=1}^{t} s_i$ and $\Sigma_{i=(t+1)}^{k} s_i$ are as close as possible, is found. In this way, a stage can be split evenly or almost evenly.

§4.5 Example Apparatus

Figure 17:
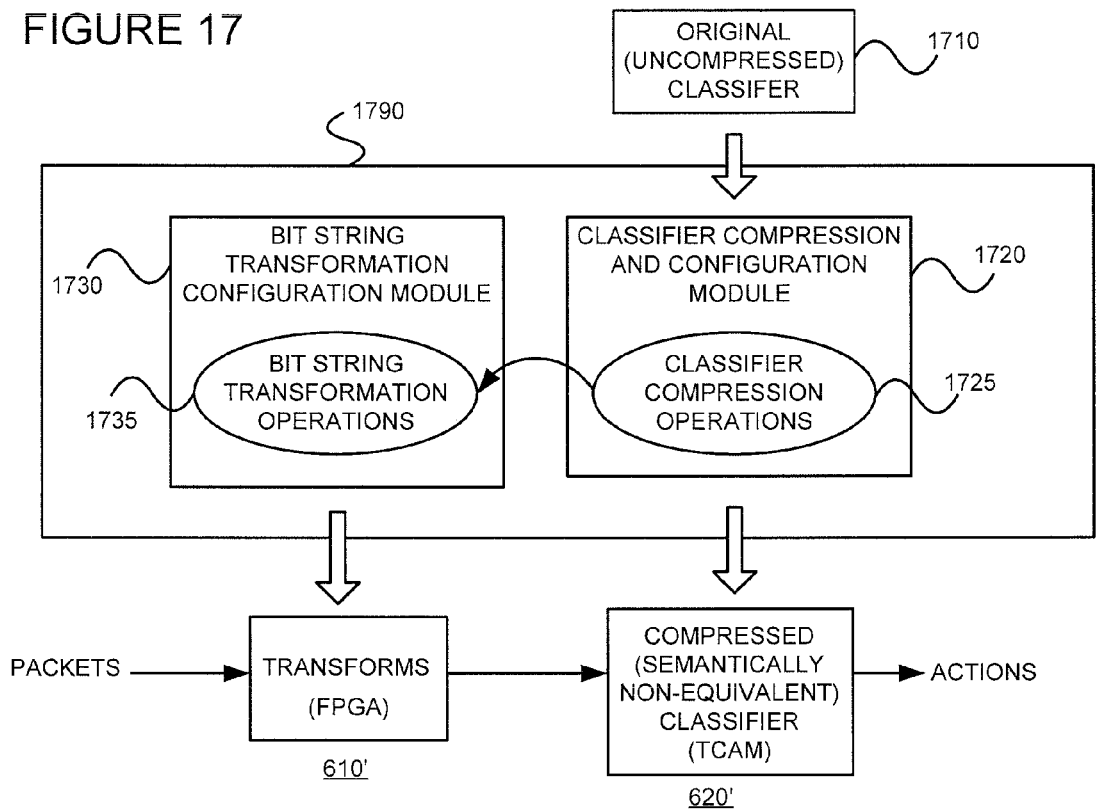
FIG. 17 is a block diagram of illustrating components of a classifier compression module consistent with the present invention, and hardware configured by such a module.

Referring to both FIGS. 6 and 17, embodiments consistent with the present invention may include a configured transformation module 610' (such as an FPGA for example) and a compressed classifier 620' (such as a TCAM for example). Referring to FIG. 17, a logic optimization module 1790 may include a classifier compression module 1720 and a bit string transformation configuration module 1730. Classifier compression operations 1725 for performing classifier compression processes such as those described above may provided as a hardware and/or software module 1720. This module 1720 accepts an original (e.g., uncompressed, or not fully compressed) classifier 1710 as an input and outputs a compressed, semantically non-equivalent classifier 620'. The bit string transformation operations 1735 may be used to configure the bit string transformation module 610' based on the permutations made by the classifier compression operations 1725. The operations 1725 may provide information about the permutations directly to the bit string transformation operations 1735 directly, or via memory. The bit string transformation operations 1735 for perform the processes such as those described above may be provided as a hardware and/or software module 1730.

In some example embodiments consistent with the present invention, the transformation module 610' and the compressed classifier 620' (e.g., TCAM, or some other parallel searching circuitry) may be provided on a single chip. Such a single chip may also include power control circuitry (not shown).

Figure 18:
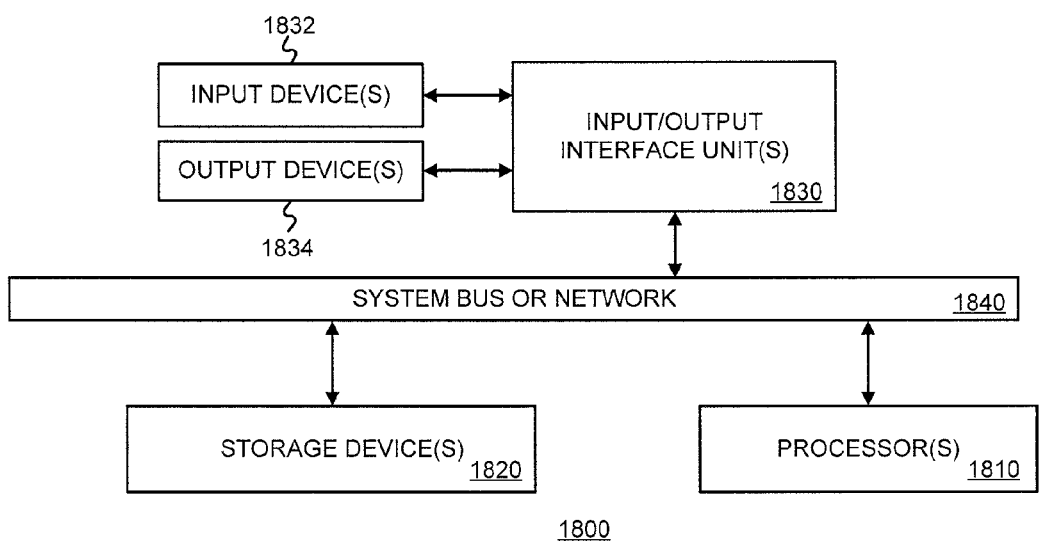
FIG. 18 is a block diagram of exemplary apparatus that may be used to perform operations of various components in a manner consistent with the present invention and/or to store information in a manner consistent with the present invention.

FIG. 18 is a block diagram of exemplary apparatus 1800 that may be used to perform operations of various components in a manner consistent with the present invention and/or to store information in a manner consistent with the present invention. The apparatus 1800 includes one or more processors 1810, one or more input/output interface units 1830, one or more storage devices 1820, and one or more system buses and/or networks 1840 for facilitating the communication of information among the coupled elements. One or more input devices 1832 and one or more output devices 934 may be coupled with the one or more input/output interfaces 1830.

The one or more processors 1810 may execute machine-executable instructions to perform one or more aspects of the present invention. For example, one or more software modules (or components), when executed by a processor, may be used to perform one or more of the methods of FIGS. 9-11. At least a portion of the machine executable instructions may be stored (temporarily or more permanently) on the one or more storage devices 1820 and/or may be received from an external source via one or more input interface units 1830.

In one embodiment, the machine 1800 may be one or more conventional computers. In this case, the processing units 1810 may be one or more microprocessors. The bus 1840 may include a system bus. The storage devices 1820 may include system memory, such as read only memory (ROM) and/or random access memory (RAM). The storage devices 1820 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, and/or solid state memory.

A user may enter commands and information into the device 1800 through input devices 1832, such as a keyboard, a microphone, a multi-touch display screen, etc. Other input devices may also be included. These and any other input devices are often connected to the processing unit(s) 1810 through an appropriate interface 130 coupled to the system bus 140. The output devices 1834 may include a monitor or other type of display device, which may also be connected to the system bus 1840 via an appropriate interface. In addition to (or instead of) the monitor, the personal computer may include other (peripheral) output devices (not shown), such as speakers for example.

The operations of components, such as those described above, may be performed on one or more computers. Such computers may communicate with each other via one or more networks, such as the Internet for example.

Alternatively, or in addition, the various operations and acts described above may be implemented in hardware (e.g., integrated circuits, application specific integrated circuits (ASICs), field programmable gate or logic arrays (FPGAs), etc.).

§4.6 Refinements, Extensions and Alternatives

Although some example methods described above pertain to TCAM-based packet classification for accepting or denying packets, they may be applied to other rule sets. For example, given a classification rule set (e.g., a sequence of DNA belongs to a specific category, or a bit string signature indicates an outcome, or a feature vector falls within a class, etc.), example embodiments consistent with the present invention may compress the rule set by making permutations in Boolean space and defining corresponding transformations. In general, embodiments consistent with the present invention change the distribution of the rule set in Boolean Space to optimize logic. Accordingly, example embodiments consistent with the present invention may be extended to other technical areas that would benefit from logic optimization.

Although rules applied to packet header information were described, information from the packet payload may be used instead or in addition.

As noted above, although example embodiments were described with respect to rules having two actions (i.e., accept or deny), other example embodiments may be applied to rules having N-ary actions, where N is greater than two.

§4.7 Experimental Results

The present inventors have performed experiments based on seven artificial classifiers generated by ClassBench (referenced above) and one real-life firewall classifier obtained from an ISP. ClassBench is a suite of tools designed by Washington University in St. Louis and intended for benchmarking packet classification algorithms and devices. ClassBench can produce synthetic classifiers that accurately model the characteristics of real classifiers. More specifically, the present inventors used the parameter sets distributed with ClassBench to generate artificial classifiers, which include three typical types of rules, Firewall (FW), Access Control List (ACL), and IP Chain (IPC). Besides the artificial classifiers, the present inventors also obtained one real-life firewall classifier from ISP, which contains more than 600 rules.

Table 1900 of FIG. 19 shows that the eight classifiers vary in size from 60 rules to 660 rules. The average prefix expansion ratio of these classifier is 1.91. The largest expansion is observed in the classifier of ipc-1 whose expansion ratio is 2.89, where 207 rules are expanded to 584 prefix-only rules.

As explained in §4.4.1.2 above, the example BP_CLASSIFER_COMPRESS algorithm has a preprocessing phase (line 15) which applies logic optimization on the classifiers to merge rules as much as possible. Logic optimization has been identified as an NP-hard problem (Recall, e.g., C. Umans, "Complexity of two-level logic minimization," *IEEE Transactions on Computer-Aided Design of Integrated Circuits and Systems,* 2006, incorporated herein by reference.). This means that the optimal solution cannot be found in polynomial-time. In the inventors' experiment, they chose the Espresso algorithm (See, e.g., P. McGeer, J. Sanghavi, R. Brayton, and A. Sangiovanni-Vincentelli, "Espresso-signature: A new exact minimizer for logic functions," *IEEE Transactions on VLSI Systems,* 1993, incorporated herein by reference.) proposed by UC Berkeley to conduct the logic optimization in the preprocessing phase. This algorithm is a sub-optimal solution for the logic optimization problem and has a run-time complexity much lower than the optimal solution. So in the inventors' experiment, they chose the Espresso algorithm to conduct the logic optimization in the preprocessing phase.

In the experiment, the example process was implemented using C++ language. In packet classification, the Boolean Space dimension L is 104. Parameters were set to $N_r$=150, $W_{min}$=54 and $N_{tp}$=1000 (this number is large enough to include most all target block pairs in the experiment).

Experiments were performed on a Linux workstation driven by Intel Xeon 2.0 GHz E5335 CPUs. During the simulation, the program recorded all permutations and the run-times of the preprocessing phase and permutation phase.

In the experiments, the transformations were implemented by using FPGA Altera Cyclone III. (See, e.g., Altera Cyclone FPGA and Quartus Tool. http://www.altera.com/, incorporated herein by reference.) The FPGA synthesis tool used is Quartus II (See, e.g., Altera Cyclone FPGA and Quartus Tool. http://www.altera.com/, incorporated herein by reference.) on Dell D630 laptop computer. Altera Cyclone was chosen due to its low price and appropriate clock rate. This kind of FPGA can run at a clock up to 400 MHZ, which is enough for a targeted throughput of 100M packets per second. Based on the targeted performance, circuits were designed on FPGA, and the hardware resource consumptions were evaluated.

§4.7.1 Classifier Compression

Figure 21:
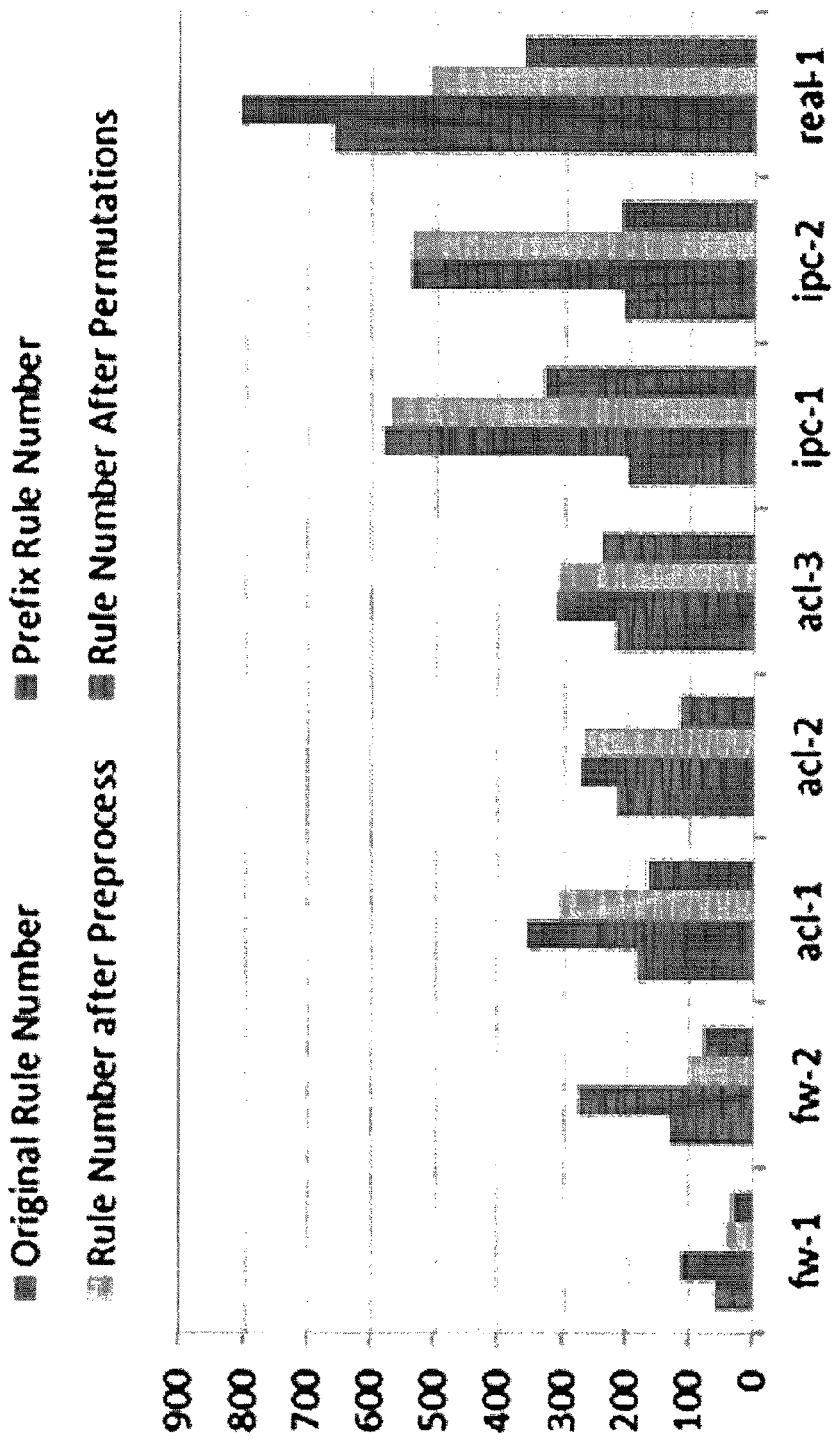
FIG. 21 is a column diagram of change of rule numbers.

The experiment results are presented in table 19 of FIG. 19 and also illustrated in FIG. 21. In table 19, the numbers of prefixes expanded from the original rules, the numbers of prefix rules reduced by the BP process and the corresponding compression ratios when compared to the number of original prefixes are listed. According to the statistics, the example BP compression process can reduce prefixes by 53.99% on average, among which the preprocessing phase contributes 22.09% and the permutation phase contributes 31.90%.

In the IPC classifiers, while the permutation phase can save 50.59% prefixes on average, the preprocessing phase barely gave any compression. Especially in ipc-2, the compression of preprocessing phase was 0. The reason of this low compression rate in the preprocessing phase is that the rule distributions of IPC classifiers are very "sparse", so direct logic optimization in preprocessing phase can barely merge rules. (Recall that this problem was one motivation of the inventors.)

In the ACL classifiers, the permutation phase contributes much more compression than the preprocessing phase does, from which one might conclude that the ACL classifiers also fall into "sparse" rule distributions.

In the FW classifiers, a compression ratio of 61.23% on average was found in the preprocessing phase. In these cases, the average compression ratio of the permutation phase was only 9.37%, which is much smaller than that of the preprocessing phase. The reason is that the rule distributions of the FW classifiers are quite "dense", so direct logic optimization has good performance. In the real-life classifier real-1, because the classifier is more close to a "dense" rule distribution than "sparse" rule distribution, the preprocessing phase contributes a larger compression than the permutation phase does. However, in this case, the permutation phase can still significantly reduce 148 prefix rules.

Besides compression results, the run-times of the BP processes are also provided in table 19. Most run-times are less than 10 minutes, and the average run-time is 15.007 minutes. The run-times vary with the number of prefixes and the compression ratio. A theoretical analysis of the computational complexity of BP algorithm was already discussed in §4.4.1.2.4, which concluded that the worst case run-time complexity is $O(N^2)$, where N is the number of prefix rules after the preprocessing phase. In the real experiments, it was also observed that a classifier with more prefix rules requires a longer run-time. In the experiments, the largest run-time was observed in real-1, because it is the largest among all classifiers.

Figure 22:
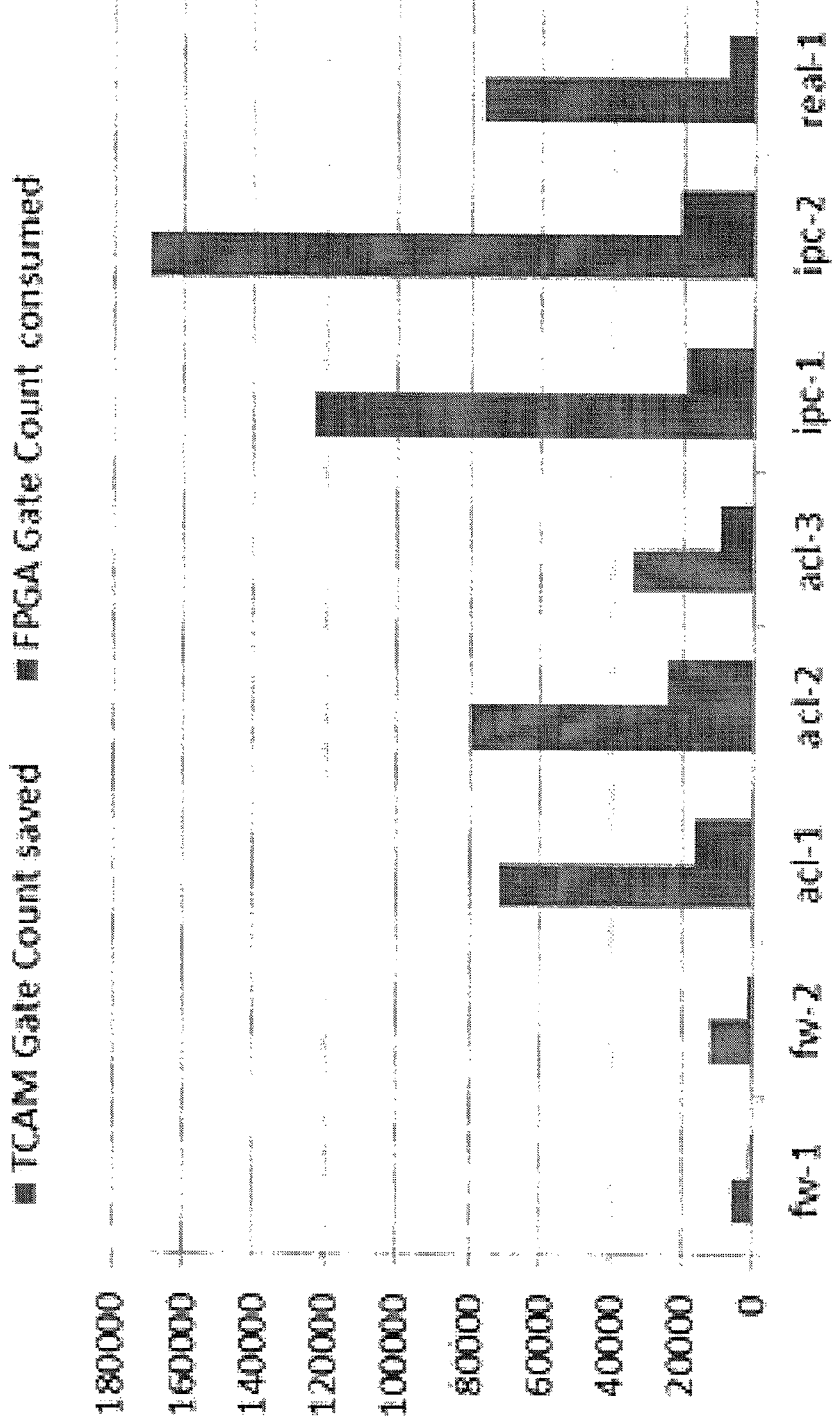
FIG. 22 is a column diagram of TCAM saved and FPGA consumed.

§4.7.2 FPGA Implementation this section discusses the inventors' experiments on transformation implementation using FPGA. In the experiments, the inventors evaluated the overhead of the BP technique, which actually covers two aspects: hardware cost and operation performance of packet classification. The experimental results are presented in table 20 of FIG. 20, and are also illustrated in FIG. 22.

For hardware cost, the concept of "Equivalent Gate Count" was used to estimate the actual hardware resource saved by using BP technique (TCAM entries reduced minus FPGA resource consumed). From the TCAM chip ICFWTNM1 (See, e.g., University of Waterloo, IC Tape-out History, http://www.ece.uwaterloo.ca/~cdr/www/chip.html, incorporated herein by reference.), one can estimate that the implementation of one TCAM bit requires about 20 transistors. Since a standard 2-input NAND gate consists of 4 transistors, we have the following equation:

$$TCAM \ Gate \ Count = \frac{\# \ of \ entries \times 104 \ bits \times 20 \ transistors}{4 \ transistors}$$

The Altera FPGA resource consumption is reported in Combinational Functions (CFs) and Registers. In the experiments, we calculate the FPGA gate count as follows:

FPGA Gate Count=# of CFs×3+# of Registers×6

The throughput requirement of packet classification operation was set to no less than 100M packets per second. Accordingly, the clock rate of the pipeline should be no less than 100 MHz. As shown in table 20, on average, around 10 pipeline stages are needed to meet the timing requirement and the actual average clock rate is estimated as 158.88 MHz while the fastest clock rate is 395.57 MHz. On this performance, the average gate count of FPGA consumption is only 18.04% of that of TCAM saved by the permutation phase. (Please see Ratio-1 in table 20.) For a more accurate analysis, those saved by the preprocessing phase should be included, and the average ratio of the FPGA overhead to the total TCAM saved by both preprocessing phase and permutation phase is as low as 13.44%. (Please see Ratio-2 in table 20.) The FPGA overhead of ACL classifiers are relatively big when compared to the TCAM saved. This is because the compressions are achieved by switching relatively small permutations blocks. Normally, one can improve throughput by using more stages which can make each stage smaller so as to run at higher clock rate, but the overall hardware cost will be increased.

The example process of FPGA implementation using the stage-grouping methodology described in §§4.4 and 4.4.2.2 above. During the implementation, the number of stages is determined, and pipelines are constructed and synthesized in an iterative manner. The implementation time is determined by iteration rounds. The more iteration rounds run, the more stages produced, thus the more implement time is required. On average, the implementation time is 21.88 minutes. (The FPGA experiments were done on laptop computer. The implementation time can be smaller if using higher performance computer.) The times used by acl-1, acl-2, ipc-1 and ipc-2 are larger than those by the other classifiers, because they have more stages.

§4.8 Conclusions

As can be appreciated from the foregoing, at least some example embodiments consistent with the present invention reduce the number of TCAM entries required to represent a classifier. Compression rate can be improved under circumstances in which direct logic optimization cannot perform effectively. The improvement is achieved by performing a series of permutations to change the distribution of rule elements in Boolean Space from sparse to dense, such that more rules can be merged into each TCAM entry. Such improvement is possible because example embodiments consistent with the present invention can search nonequivalent classifiers, and are not limited to equivalent classifiers as previous schemes were. Example embodiments consistent with the present invention can easily be extended to other technologies that would benefit from logic optimization. Thus, the present invention is not limited to the applications of packet classification and TCAM, but can also be applied to other hardware implementation-based applications.

What is claimed is:

1. A computer-implemented method for providing an efficient physical implementation of a first classifier defined by a first rule set, at least a part of which first classifier having a sparse distribution in Boolean space, the computer-implemented method comprising:
    a) converting the first classifier, having a corresponding Boolean space, into a second classifier, wherein the second classifier has a corresponding Boolean space which is not semantically equivalent to the Boolean space corresponding to the first classifier, and wherein the second classifier is defined by a second set of rules which is smaller than the first set of rules defining the first classifier;
    b) storing a data structure representing the second classifier; and
    c) configuring a bit string transformation component to transform a first bit string into a second bit string, wherein applying the first bit string to the first classifier is equivalent to applying the second bit string to the second classifier.

2. The computer-implemented method of claim 1, wherein a "block" is a hyper-rectangle in Boolean space, wherein each block corresponds to a rule of the first rule set defining the first classifier, and wherein the act of converting the first classifier into a second classifier includes
    1) receiving a Boolean space representation of the first classifier;
    2) for each of a plurality of processing rounds,
        A) attempting to find the largest pair of target blocks as candidates to be merged, wherein a pair of target blocks
            i) have a block distance of at least two, wherein a block distance between two blocks is defined as a number of different non-wildcard counterpart bits in the two blocks,
            ii) have the same block size, wherein a block size of a block is defined as the number of points in Boolean space contained in the block,
            iii) have wildcards, the same direction, wherein two blocks have the same direction if the two blocks have no or if the two blocks have wildcards that all appear in the same bit positions, and
            iv) are associated with the same action,
        B) responsive to a determination that a pair of target blocks is found, attempting to find a pair of assistant blocks which, if switched, allow the pair of target blocks to be merged, wherein the pair of assistant blocks is attempted to be found by
            i) finding all possible assistant blocks whose size is at least as large as the size of each of the pair of target blocks,
            ii) evaluating, for each pair of assistant blocks, a compression effect on a number of rules defining a revised classifier if the pair of assistant blocks were switched and the pair of target blocks were merged, and
            iii) selecting a pair of assistant blocks based on a result of the evaluation, and
        C) responsive to a determination that a pair of assistant blocks is found,
            i) finding any rules affected by switching the assistant blocks and changing their representations in Boolean space accordingly, and
            ii) merging any pair of rules if they have
                a block distance of 1,
                the same block size,
                the same block direction, and
                the same action.

3. The computer-implemented method of claim 2 wherein the minimum assistant block size parameter is one.

4. The computer-implemented method of claim 1 wherein the first bit string includes packet header information.

5. The computer-implemented method of claim 1 wherein a cost function corresponding to programmable logic implementing the bit string transformation component is less than a difference in cost functions of a TCAM implementation of the first classifier and a TCAM implementation of the second classifier.

6. The computer-implemented method of claim 5 wherein the cost function is a function of a number of transistors.

7. The computer-implemented method of claim 1 wherein the first classifier consists of a rule set defining binary actions.

8. The computer-implemented method of claim 1 wherein the first classifier consists of a rule set defining n-ary actions, where n is greater than two.

9. The computer-implemented method of claim 1 wherein a "block" is a hyper-rectangle in Boolean space, wherein each block corresponds to a rule of the first rule set defining the first classifier,
   wherein the act of converting the first classifier into a second classifier includes a series of block permutations, and
   wherein the act of configuring a bit string transformation component includes
      1) receiving a target clock rate,
      2) determining a transformation corresponding to each of the block permutations,
      3) grouping all of the determined transformations into a single stage, and
      4) while an estimated clock rate of the bit string transformation component is slower than the target clock rate,
         A) splitting the worst performing stage of the bit string transformation component into two new stages, and
         B) pipelining the resulting stages.

10. Apparatus emulating a first classifier defined by a first rule set, at least a part of which first classifier having a sparse distribution in Boolean space, the apparatus comprising:
   a) a second classifier module, wherein the second classifier has a corresponding Boolean space which is not semantically equivalent to the Boolean space corresponding to the first classifier, and wherein the second classifier is defined by a second set of rules which is smaller than the first set of rules defining the first classifier; and
   b) a bit string transformation module which transforms a first bit string into a second bit string, wherein applying the first bit string to the first classifier is equivalent to applying the second bit string to the second classifier.

11. The apparatus of claim 10 wherein both the second classifier module and the bit string transformation module are provided on a single chip.

12. The apparatus of claim 11 further comprising:
   c) a power control module provided on the single chip.

13. The apparatus of claim 10 the second classifier module is a TCAM.

14. The apparatus of claim 10 the bit string transformation module is an FPGA.

15. Apparatus comprising:
   a) at least one processor; and
   b) at least one non-transitory storage device storing processor-executable instructions which, which executed by the at least one process, cause the at least one processor to perform a method for providing an efficient physical implementation of a first classifier defined by a first rule set, at least a part of which first classifier having a sparse distribution in Boolean space, the method including
      1) converting the first classifier, having a corresponding Boolean space, into a second classifier, wherein the second classifier has a corresponding Boolean space which is not semantically equivalent to the Boolean space corresponding to the first classifier, and wherein the second classifier is defined by a second set of rules which is smaller than the first set of rules defining the first classifier;
      2) storing a data structure representing the second classifier; and
      3) configuring a bit string transformation component to transform a first bit string into a second bit string, wherein applying the first bit string to the first classifier is equivalent to applying the second bit string to the second classifier.

16. The apparatus of claim 15, wherein a "block" is a hyper-rectangle in Boolean space, wherein each block corresponds to a rule of the first rule set defining the first classifier, and wherein the act of converting the first classifier into a second classifier includes
   1) receiving a Boolean space representation of the first classifier;
   2) for each of a plurality of processing rounds,
      A) attempting to find the largest pair of target blocks as candidates to be merged, wherein a pair of target blocks
         i) have a block distance of at least two, wherein a block distance between two blocks is defined as a number of different non-wildcard counterpart bits in the two blocks,
         ii) have the same block size, wherein a block size of a block is defined as the number of points in Boolean space contained in the block,
         iii) have wildcards, the same direction, wherein two blocks have the same direction if the two blocks have no or if the two blocks have wildcards that all appear in the same bit positions, and
         iv) are associated with the same action,
      B) responsive to a determination that a pair of target blocks is found, attempting to find a pair of assistant blocks which, if switched, allow the pair of target blocks to be merged, wherein the pair of assistant blocks is attempted to be found by
         i) finding all possible assistant blocks whose size is at least as large as the size of each of the pair of target blocks,
         ii) evaluating, for each pair of assistant blocks, a compression effect on a number of rules defining a revised classifier if the pair of assistant blocks were switched and the pair of target blocks were merged, and
         iii) selecting a pair of assistant blocks based on a result of the evaluation, and
      C) responsive to a determination that a pair of assistant blocks is found,
         i) finding any rules affected by switching the assistant blocks and changing their representations in Boolean space accordingly, and
         ii) merging any pair of rules if they have
            a block distance of 1,
            the same block size,
            the same block direction, and
            the same action.

17. The apparatus of claim 15 wherein a cost function corresponding to programmable logic implementing the bit string transformation component is less than a difference in cost functions of a TCAM implementation of the first classifier and a TCAM implementation of the second classifier.

18. The apparatus of claim 17 wherein the cost function is a function of a number of transistors.

19. The apparatus of claim 15 wherein the first classifier consists of a rule set defining n-ary actions, where n is two or more.

20. The apparatus of claim 15 wherein a "block" is a hyper-rectangle in Boolean space, wherein each block corresponds to a rule of the first rule set defining the first classifier,
- wherein the act of converting the first classifier into a second classifier includes a series of block permutations, and
- wherein the act of configuring a bit string transformation component includes
  1) receiving a target clock rate,
  2) determining a transformation corresponding to each of the block permutations,
  3) grouping all of the determined transformations into a single stage, and
  4) while an estimated clock rate of the bit string transformation component is slower than the target clock rate,
     A) splitting the worst performing stage of the bit string transformation component into two new stages, and
     B) pipelining the resulting stages.

* * * * *